(12) United States Patent
Al-Salameh et al.

(10) Patent No.: US 6,721,502 B1
(45) Date of Patent: Apr. 13, 2004

(54) SHARED OPTICAL PROTECTION RING ARCHITECTURE

(75) Inventors: Daniel Y. Al-Salameh, Marlboro, NJ (US); Donald L. Husa, Ocean, NJ (US); David S. Levy, Freehold Township, Monmouth County, NJ (US); Timothy O. Murphy, Perinton, NY (US); Gaylord W. Richards, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 424 days.

(21) Appl. No.: 09/675,733

(22) Filed: Sep. 30, 2000

(51) Int. Cl.[7] ............................. G02F 1/00; H04B 10/00
(52) U.S. Cl. ...................... 398/3; 398/2; 398/5; 398/12
(58) Field of Search ............................ 398/2–5, 12, 59, 398/55, 45

(56) References Cited

U.S. PATENT DOCUMENTS

| | | |
|---|---|---|
| 5,745,476 A | 4/1998 | Chaudhuri |
| 5,903,370 A | 5/1999 | Johnson |
| 5,986,783 A | 11/1999 | Sharma et al. |
| 6,046,833 A | 4/2000 | Sharma et al. |
| 6,088,141 A | 7/2000 | Merli et al. |
| 6,262,820 B1 * | 7/2001 | Al-Salameh ................. 398/12 |
| 6,362,905 B1 * | 3/2002 | Fukashiro et al. ............ 398/82 |
| 6,414,771 B2 * | 7/2002 | Al-Salameh et al. .......... 398/48 |
| 6,597,826 B1 * | 7/2003 | Ramaswami et al. ......... 385/17 |

OTHER PUBLICATIONS

An article entitled A Demonstration of an Optical Switch Circuit with "Bridge And Switch" Funtion Etc., by T. Miyazaki et al, publish Feb., 1999, IEICE Trans Commun. vol. E82B, No. 2, pp. 326–334 (copy attached).

* cited by examiner

Primary Examiner—Kinfe-Michael Negash

(57) ABSTRACT

An optical transmission system formed from a plurality of nodes interconnected in a ring configuration via at least two transmission media provides protection capacity for each optical channel. If a channel signal does not meet predetermined criteria, then a loss of signal indication is declared for the channel and one of a plurality of protection switching states is invoked to re-route service traffic carried by the impaired channel to its destination via corresponding protection capacity. The switching states include particular transmission states and at least "keep-alive" and "protection access" states.

46 Claims, 37 Drawing Sheets

FIG. 4A

| | STATE | PORT-TO-PORT CONNECTIVITY | T/P |
|---|---|---|---|
| 1 | ONE SERVICE CHANNEL SOURCE, 1+1 SPAN PROTECTION EAST READY | EJ, DK, DL, FM | T |
| 2 | ONE SERVICE CHANNEL SOURCE, 1+1 SPAN PROTECTION WEST READY | HI, AN, AM, GL | T |
| 3 | TWO SERVICE CHANNEL SOURCES, 1+1 SPAN PROTECTION EAST READY, AND 1+1 SPAN PROTECTION WEST READY | HI, AN, AM, DK, DL, EJ | T |
| 4 | ONE SERVICE CHANNEL SOURCE, PATH DIVERSE 1+1 SPAN PROTECTION EAST ACTIVE | DK, DM, GJ, GL | P |
| 5 | ONE SERVICE CHANNEL SOURCE, PATH DIVERSE 1+1 SPAN PROTECTION WEST ACTIVE | AN, AL, FI, FM | P |
| 6 | TWO SERVICE CHANNEL SOURCES, PATH DIVERSE 1+1 SPAN PROTECTION EAST ACTIVE, NORMAL OPERATION WEST | GJ, DK, DM, HI, AN, GL | P |
| 7 | TWO SERVICE CHANNEL SOURCES, PATH DIVERSE 1+1 SPAN PROTECTION WEST ACTIVE, NORMAL OPERATION EAST | FI, AN, AL, EJ, DK, FM | P |
| 8 | TWO SERVICE CHANNEL SOURCES, 1+1 SPAN PROTECTION EAST READY, 1+1 SPAN PROTECTION WEST ACTIVE | DK, DL, EJ, AN, AM, GI | P |
| 9 | TWO SERVICE CHANNEL SOURCES, 1+1 SPAN PROTECTION WEST READY, 1+1 SPAN PROTECTION EAST ACTIVE | DK, DL, FJ, AM, AN, HI | P |
| 10 | TWO SERVICE CHANNEL SOURCES, 1+1 SPAN PROTECTION EAST ACTIVE, PROTECTION ACCESS WEST | AN, HI, GP, RM, FJ, DL, DK | P |
| 11 | TWO SERVICE CHANNEL SOURCES, 1+1 SPAN PROTECTION WEST ACTIVE, PROTECTION ACCESS EAST | DK, EJ, FO, QL, AN, AM, GI | P |
| 12 | TWO SERVICE CHANNEL SOURCES, 1+1 SPAN PROTECTION EAST ACTIVE, 1+1 SPAN PROTECTION WEST ACTIVE | DK, DL, FJ, AN, AM, GI | P |
| 13 | ONE SERVICE CHANNEL SOURCE, 1+1 SPAN PROTECTION EAST ACTIVE | DK, DL, FJ, FM | P |
| 14 | ONE SERVICE CHANNEL SOURCE, 1+1 SPAN PROTECTION WEST ACTIVE | AN, AM, GL, GI | P |
| 15 | ONE SERVICE CHANNEL SOURCE, PATH DIVERSE 1+1 SPAN PROTECTION EAST READY | DK, DM, EJ, GL | T |

FIG. 4B

| | STATE | PORT-TO-PORT CONNECTIVITY | T/P |
|---|---|---|---|
| 16 | ONE SERVICE CHANNEL SOURCE, PATH DIVERSE 1+1 SPAN PROTECTION WEST READY | HI, AN, AL, FM | T |
| 17 | TWO SERVICE CHANNEL SOURCES, PATH DIVERSE 1+1 SPAN PROTECTION EAST AND WEST READY | AN, AL, DK, DM, HI, EJ | T |
| 18 | TWO SERVICE CHANNEL SOURCES, PATH DIVERSE 1+1 SPAN PROTECTION WEST ACTIVE, PATH DIVERSE 1+1 SPAN PROCTECTION EAST READY | AN, AL, DK, DM, FI, EJ | P |
| 19 | TWO SERVICE CHANNEL SOURCES, PATH DIVERSE 1+1 SPAN PROTECTION EAST ACTIVE, PATH DIVERSE 1+1 SPAN PROTECTION WEST READY | AN, AL, DK, DM, HI, GJ | P |
| 20 | TWO SERVICE CHANNEL SOURCES, PATH DIVERSE 1+1 SPAN PROTECTION EAST AND WEST ACTIVE | AN, AL, DK, DM, FI, GJ | P |
| 21 | PROTECTION ACCESS EAST AND WEST | DK, EJ, QL, FO, RM, GP, AN, HI | P |
| 22 | TWO SERVICE CHANNEL SOURCES, PROTECTION CHANNEL PASS THRU | DK, EJ, HI, AN, GL, FM | T |
| 23 | TWO SERVICE CHANNEL SOURCES, PROTECTION ACCESS WEST, 1+1 SPAN PROTECTION EAST READY | AN, HI, RM, GP, DK, DL, EJ | T |
| 24 | TWO SERVICE CHANNEL SOURCES, PROTECTION ACCESS EAST, 1+1 SPAN PROTECTION WEST READY | AN, AM, HI, QL, FO, DK, EJ | T |
| 25 | ONE SERVICE CHANNEL SOURCE, PROTECTION ACCESS EAST, PATH DIVERSE 1+1 SPAN PROCTECTION EAST READY | DK, EJ, FO, DM, QL | T |
| 26 | ONE SERVICE CHANNEL SOURCE, PROTECTION ACCESS WEST, PATH DIVERSE 1+1 SPAN PROTECTION WEST READY | AN, HI, RM, GP, GL | T |
| 27 | ONE SERVICE CHANNEL SOURCE, PROTECTION ACCESS EAST, PATH DIVERSE 1+1 SPAN PROTECTION EAST ACTIVE | DK, DM, GJ, FO, QL | P |
| 28 | ONE SERVICE CHANNEL SOURCE, PROTECTION ACCESS WEST, PATH DIVERSE 1+1 SPAN PROTECTION WEST ACTIVE | AN, AL, FI, RM, GP | P |
| 29 | ONE SERVICE CHANNEL SOURCE EAST, PROTECTION CHANNEL PASS THRU | DK, EJ, FM, GL | P |
| 30 | ONE SERVICE CHANNEL SOURCE WEST, PROTECTION CHANNEL PASS THRU | AN, HI, FM, GL | P |

FIG. 34

| # | SE | SW | ET_E | ET_W | PORT-TO-PORT CONNECTIVITY LIST | T/P |
|---|----|----|------|------|--------------------------------|-----|
| 1 | X |   |   |   | EJ, DK, DL, FM, AN, HI, OPEN 11 AND 12 | T |
| 2 |   | X |   |   | HI, AN, AM, GL, DK, EJ, OPEN 11 AND 12 | T |
| 3 | X | X |   |   | HI, AN, AM, DK, DL, EJ, OPEN 11 AND 12 | T |
| 4 | X |   |   |   | DK, DM, GJ, GL, AN, HI, OPEN 11 AND 12 | P |
| 5 |   | X |   |   | AN, AL, FI, FM, DK, EJ, OPEN 11 AND 12 | P |
| 6 | X | X |   |   | GJ, DK, DM, HI, AN, GL, OPEN 11 AND 12 | P |
| 7 | X | X |   |   | FI, AN, AL, EJ, DK, FM, OPEN 11 AND 12 | P |
| 8 | X | X |   |   | DK, DL, EJ, AN, AM, GI, OPEN 11 AND 12 | P |
| 9 | X | X |   |   | DK, DL, FJ, AM, AN, HI, OPEN 11 AND 12 | P |
| 10 | X | X |   | X | AN, HI, GP, RM, FJ, DL, DK, OPEN 11 | P |
| 11 | X | X | X |   | DK, EJ, FO, QL, AN, AM, GI, OPEN 12 | P |
| 12 | X | X |   |   | DK, DL, FJ, AN, AM, GI, OPEN 11 AND 12 | P |
| 13 | X |   |   |   | DK, DL, FJ, FM, AN, HI, OPEN 11 AND 12 | P |
| 14 |   | X |   |   | AN, AM, GL, GI, DK, EJ, OPEN 11 AND 12 | P |
| 15 | X |   |   |   | DK, DM, AN, EJ, GL, HI, OPEN 11 AND 12 | T |
| 16 |   | X |   |   | HI, AN, AL, DK, FM, EJ, OPEN 11 AND 12 | T |
| 17 | X | X |   |   | AN, AL, DK, DM, HI, EJ, OPEN 11 AND 12 | T |
| 18 | X | X |   |   | AN, AL, DK, DM, FI, EJ, OPEN 11 AND 12 | P |
| 19 | X | X |   |   | AN, AL, DK, DM, HI, GJ, OPEN 11 AND 12 | P |
| 20 | X | X |   |   | AN, AL, DK, DM, FI, GJ, OPEN 11 AND 12 | P |
| 21 | X | X | X | X | DK, EJ, QL, FO, RM, GP, AN, HI | P |
| 22 | X | X |   |   | DK, EJ, HI, AN, GL, FM, OPEN 11 AND 12 | T |
| 23 | X | X |   | X | AN, HI, RM, GP, DK, DL, EJ, OPEN 11 | T |
| 24 | X | X | X |   | AN, AM, HI, QL, FO, DK, EJ, OPEN 12 | T |
| 25 | X |   |   | X | DK, DM, EJ, FO, QL, AN, HI, OPEN 12 | T |
| 26 |   | X |   | X | AN, HI, RM, GP, AL, DK, EJ, OPEN 11 | T |
| 27 | X |   |   | X | DK, DM, GJ, FO, QL, AN, HI, OPEN 12 | P |
| 28 |   | X |   | X | AN, AL, FI, RM, GP, DK, EJ, OPEN 11 | P |
| 29 | X |   |   |   | DK, EJ, FM, GL, AN, HI, OPEN 11 AND 12 | P |
| 30 |   | X |   |   | AN, HI, FM, GL, DK, EJ, OPEN 11 AND 12 | P | ced
SHARED OPTICAL PROTECTION RING ARCHITECTURE

TECHNICAL FIELD

The invention relates to optical communications networks, and more particularly relates to a protection ring architecture for such networks.

BACKGROUND OF THE INVENTION

Optical transmission systems and, especially systems using Dense Wavelength Division Multiplexing (DWDM), are desirable since they provide extremely wide bandwidths for communications channels. Each DWDM transmission system carries a plurality of, for example, 16, 40 even 80, optical channels (wavelengths) on a single optical fiber and single optical repeater. However, there is a trade off between providing wider bandwidth communications channels, with their corresponding lower cost of transport, and their vulnerability to a large-scale disruption of communications services because of a transmission equipment and/or medium failure. It is, therefore, important that an optical transmission system, for example, those employing DWDM, have the capability to quickly recover from a transmission medium failure to prevent the failure from disrupting communications services.

Prior attempts at providing adequate restoration in optical transmission systems have focused on either so-called 1+1 optical protection switching or 0×1 optical protection switching. The former type of protection switching is relatively expensive and less efficient when compared with the latter type. The reason for this is that in 1+1 optical protection switching the service traffic is transmitted simultaneously over both the service channel and corresponding protection channel. It appears that an optical transmission system typically provides either 1+1 optical protection switching or 0×1 optical protection switching, but not both. Consequently, customer traffic using an optical transmission system to reach an intended recipient is locked into the type of protection switching provided by the transmission system, even if that type of protection switching is the more expensive 1+1 type.

SUMMARY OF THE INVENTION

The capabilities of prior optical systems are advanced in an optical communications system comprising a plurality of optical nodes interconnected in a conventional optical ring configuration using at least a pair of optical transmission media. The optical transmission media may be, for example, optical fiber. Specifically, in accordance with various aspects of the invention, the capabilities of an optical node are advanced to include a plurality of different transmission states involving one or more sources and to effect either 1+1 optical protection switching, 0×1 optical protection switching, or span protection switching to recover from a optical transmission media failure. Moreover, in accordance with an aspect of the invention, sources/clients who respectively transport data over the same channel in different directions (east or west) in an optical ring may elect different (or the same) forms of protection switching. For example, a customer who's data is transmitted upstream (westerly) may elect, for example, 1+1 protection, and the customer who's data is transported downstream (easterly) may elect, for example, span protection (or 0×1 protection). Further, if a protection channel for a given direction is not being used for 1+1 protection, then the channel may be used to transport "pre-emptory" traffic/data on behalf of still another source. However, such traffic may be quickly removed from the protection channel if the channel is needed for "backup" protection of a corresponding service channel. Further, in accordance with various aspects of the invention, such optical protection switching also includes "keep-alive" and "protection access" states, as will be discussed below.

The foregoing is achieved using an efficient switching matrix characterized by a unique set of switching transmission and protection states including access without protection switching. In a shared configuration, protection capacity is provided for each service channel.

These and other aspects of the invention will be more apparent from the following detailed description when considered in conjunction with the accompanying drawings.

BRIEF DESCRIPTION OF THE DRAWINGS

In the drawings:

FIGS. 4A and 4B define the allowable optical switching states of the optical switch fabric of FIG. 3 for both terminal optical nodes and intermediate pass through optical nodes;

FIG. 34 is an expanded version of FIGS. 4A and 4B;

DETAILED DESCRIPTION

Figure 1:
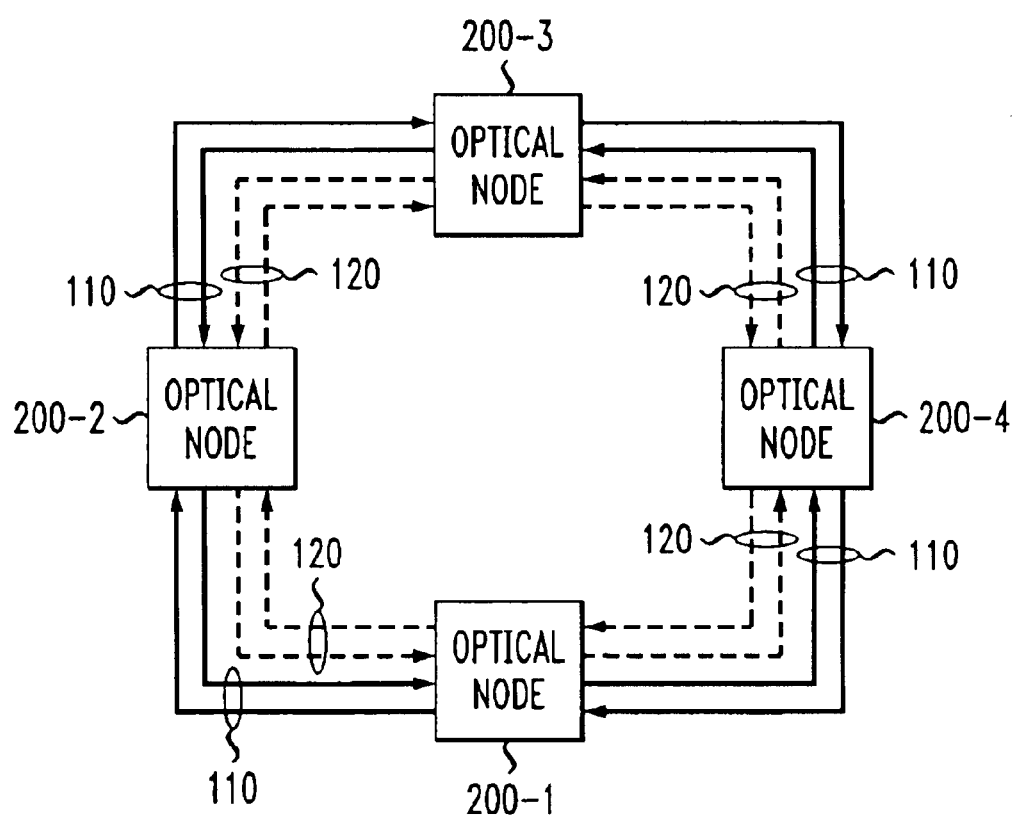
FIG. 1 is broad block diagram of an optical ring transmission system in which the principles of the invention may be practiced.

Bi-directional optical transmission system 100 shown in simplified form in FIG. 1 comprises a plurality of optical nodes connected in a ring configuration. For the sake of simplicity and clarity only four of the optical nodes, 200-1 through 200-4, are shown, in which each of the nodes incorporates an embodiment of the invention. Optical nodes 200-1 through 200-4 are interconnected in a ring configuration by optical transmission media 110 which transports, e.g., active (primary) service transmission capacity. Nodes 200-1 thorough 200-4 are also interconnected in a ring configuration by optical transmission media 120 which transports, e.g., standby (protection) transmission capacity. In accordance with an aspect of the invention, the latter capacity may be used to transport what we call pre-emptory (secondary) service traffic, which a node sheds in favor of the active service traffic, as will be explained below in detail. In an illustrative embodiment of the invention, optical transmission medium 110 and 120 are formed from optical fibers, and each may be comprised of a single optical fiber or two optical fibers. To say it another way, optical transmission system 100 could be either a two optical fiber system or a four optical fiber system, in which each of the fibers includes one-half of the service bandwidth and one-half of the protection bandwidth. In an alternative embodiment of the invention, one of the two optical fibers may carry active service transmission capacity and the other one of the two fibers may carry protection transmission capacity. In a four optical fiber system, separate optical fibers are used to transport active service transmission capacity in both directions of transmission and separate optical fibers are used to transport standby protection transmission capacity in both direction of transmission. Optical transmission system 100 may transport 8, 16, 32, 40, 80, etc. communications channels, i.e., wavelengths. Note that, in addition to the communications channels, an extra telemetry control (supervisory) channel may be used as a maintenance channel in the two optical fiber arrangement or the four optical fiber arrangement. Thus, nine channels are transported in an eight channel system, 17 channels are transported in a sixteen channel system, , and so on. The maintenance channel is used, among other things, to transport protection switching information for configuring nodes 200-1 through 200-4 in system 100, as will be described below.

Figure 2:
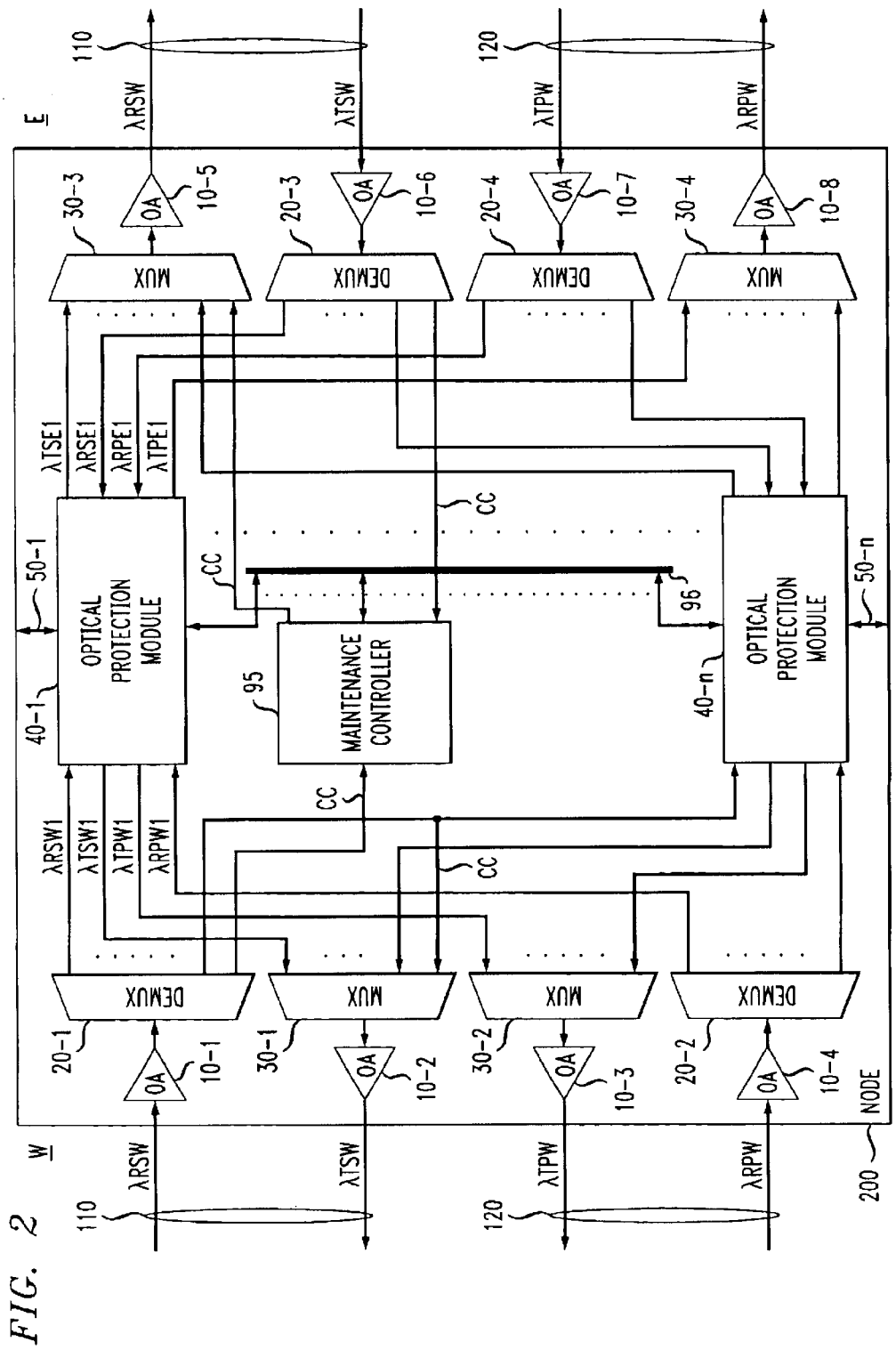
FIG. 2 is a broad block diagram of an optical node of FIG. 1.

A simplified block diagram of an optical node, e.g., node 200-i, is shown in FIG. 2. Note that the following description of node 200-i equally pertains to each of the other nodes forming system 100. In particular, and as shown in FIG. 1, active bi-directional service capacity is transported on optical transmission media 110 and standby protection capacity is transported on optical transmission media 120. The optical service signal and optical protection signal received from the West (W), $\lambda_{RSW}$ and $\lambda_{RPW}$, are respectively amplified at conventional optical amplifiers OA 10-1 and 10-4. The amplified results are then supplied to respective demultiplexers 20-1 and 20-2, each of which may be, for example, a Dragone router. Demultiplexer 20-1 demultiplexes the amplified optical signal $\lambda_{RSW}$ and supplies the component signals (channels) $\lambda_{RSW1}$ through $\lambda_{RSWn}$ forming the received signal $\lambda_{RSW}$ to respective optical protection modules 40-1 through 40-n. Demultiplexer 20-2 performs a similar operation on the received $\lambda_{RPW}$ and also supplies the demultiplexed corresponding component channels, $\lambda_{RPW1}$ through $\lambda_{RPWn}$, to respective optical protection modules 40-1 through 40-n. The component service channels $\lambda_{TSW1}$ through $\lambda_{TSWn}$ that are to be transmitted in the West, W, direction are outputted by optical protection modules 40-1 through 40-n, respectively, and supplied to respective inputs of conventional multiplexer 30-1, which may be, for example, a Dragone router. Multiplexer 30-1 multiplexes the signals that it receives at its inputs to an output connected to conventional optical amplifier 10-3, which amplifies the multiplexed signals and outputs the result as signal $\lambda_{TSW}$. Multiplexer 30-2 and OA 10-3 operate similarly with respect to the protection channels outputted as $\lambda_{TPW}$.

The above operations are similarly applied to signals $\lambda_{TSE}$, $\lambda_{TSE}$, $\lambda_{TPE}$ and $\lambda_{TPE}$, which are demultiplexed and respectively supplied to optical protection modules 40-1 through 40-n, in the manner shown in FIG. 2. If a service channel suffers one of a number of different problems, e.g., the optical signal carried in the channel is degraded in some way, then the optical protection module 40-i receiving the faulty signal will detect the problem and deactivate the channel, placing it in a standby mode. The protection module also invokes a protection scheme selected previously by the respective client/customer. For example, if protection module 40-1 detects a problem with the optical signal carried in channel $\lambda_{S1}$, then protection module 40-1 effects one of a plurality of different protection schemes to deal with the problem. Protection module 40-1 may simply place that channel in an out-of-service state, activate the corresponding protection channel $\lambda_{P1}$ and transfer the customer's traffic received over one of the multiple paths 50-1 to the protection channel. As a feature of the inventive system, if the protection channel is being used to transport so-called pre-emptory traffic, then the protection module 40-1 sheds the pre-emptory traffic replacing it with the higher priority service traffic that was being transported via the failed service channel. As another feature of the inventive system, a simple switching fabric is employed to effect switching traffic between a service channel and the corresponding protection channel for one or more clients/customers, as will be discussed below in detail.

The above-mentioned protection schemes as well as various transmission schemes are respectively defined in FIGS. 4A and 4B. Specifically, referring to both FIGS. 4A and 4B, in which the same field designations are used in both FIGS., a protection or transmission scheme is numerically identified by a particular value in field 4-1 of a row of information. More descriptive specification/information is provided in field 4-2. The switch fabric 70-1 connections that need to be established to effect the scheme specified in field 4-2 are set forth in field 4-3. For example, for state 1, field 4-3 specifies that connections between ports E and J, D and K, D and L, F and M, and A and N of a protection module need to be made to effect the specified scheme. Associated field 4-4 indicates that the scheme is either a transmission (T) scheme or a protection (P) scheme. The FIG. 4A (4B) term "transmission" is taken to mean that traffic/data received over a service channel is dropped (supplied) to the intended source whereas the term "protection" is taken to mean that traffic/data received over a protection channel is dropped to the intended source, as will be explained below.

Figure 3:
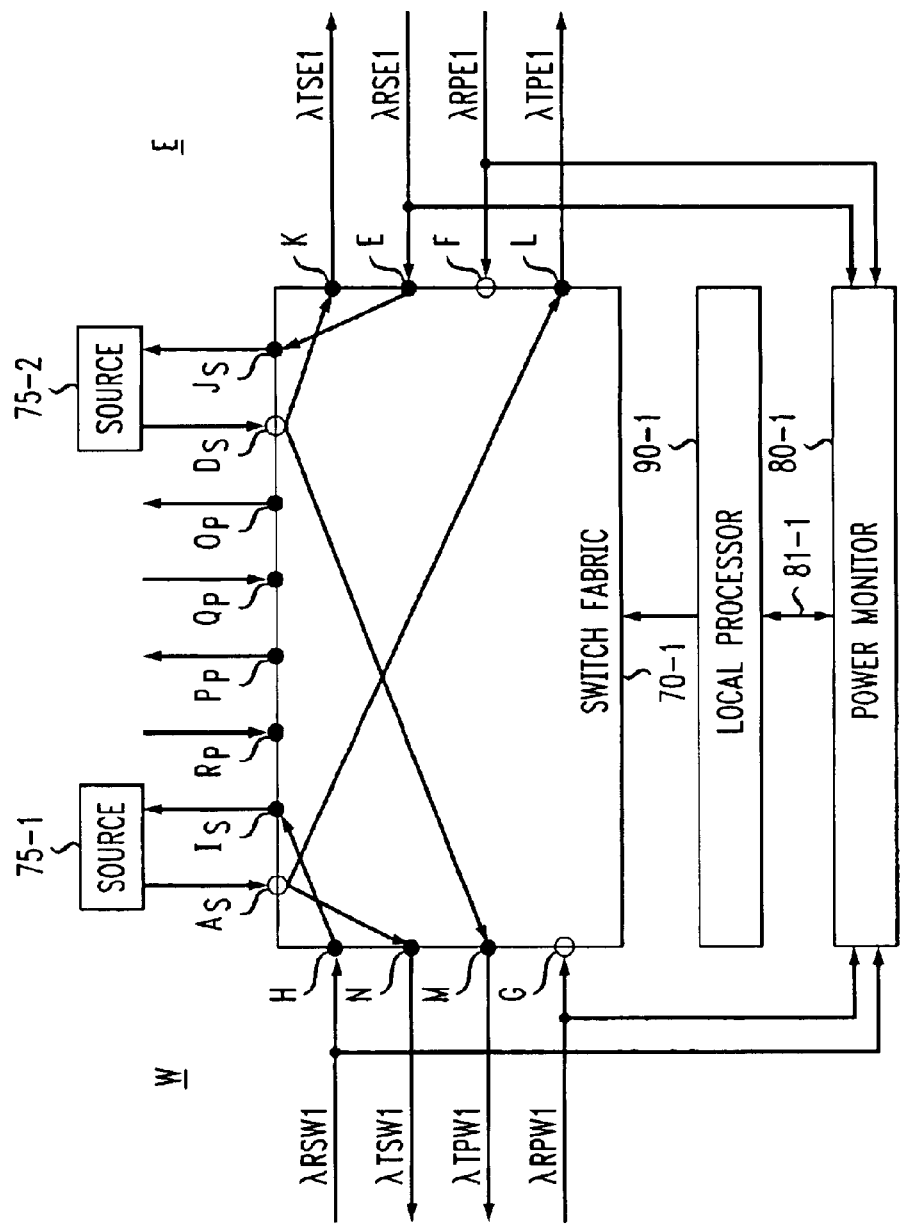
FIG. 3 is a broad block diagram of an optical protection module of FIG. 2 effecting a particular transmission state.

For example, FIG. 3 shows a simplified block diagram of an illustrative embodiment of an optical protection module, e.g., module 40-i, operating in what we call a two service channel sources, path diverse 1+1 span protection East and West ready state (also referred to herein as a "keep alive" state), all in accordance with an aspect of the invention. As will be discussed below, the "keep alive" state (defined as, state 17 in FIG. 4A) is one of a plurality, e.g., 28, of different transmission and protection states that a protection module 40-i effects. The keep-alive state is a state in which service traffic is sent over the respective service channel and sent in the opposite direction over a protection channel/path to "keep" the equipment disposed along the protection path "alive". We do this so that the protection channel may be quickly placed into service without having to wait for the equipment that supports the protection channel to "boot up" whenever the corresponding service channel becomes faulty. In this way the connections defined by state 17 also achieve transmission path diversity.

Note that the foregoing and following discussion of protection module 40-i, As well as the following discussion of protection module 40-j and FIGS. 4A and 4B equally pertains to the other protection modules 40 within the optical nodes 200 forming ring 100, FIG. 1.)

It is seen from FIG. 3 that an optical protection module 40-i includes, inter alia, optical switch fabric 70-1 (also referred to herein as an optical switch matrix) which exchanges optical signals with different customer source equipment via ports A, I, R, P, Q, O, D and J, in which the subscripts s and p denote service traffic and protection traffic, respectively. A signal received at a port may be split and supplied to multiple output ports, as shown by the circle for port As and Ds, and as is similarly shown for input ports G and F, as mentioned above. (Herein a source, also referred to as terminal equipment may include, for example, a synchronous optical network/synchronous digital hierarchy (SONET/SDH) terminal, or asynchrounous transfer mode (ATM) switch, or an Internet Protocol (IP) router, customer equipment, or the like.)

As shown for "keep alive" state 17, FIG. 3, an optical service signal received from source 75-1 via port $A_S$ is split such that first and second portions/segments of the signal are supplied via respective direct controllable switch fabric 70-1 connections to output port N for transmission upstream in the West direction as service signal $\lambda_{TSW1}$ and to output port L for transmission in the opposite East direction as protection signal $\lambda_{TPE1}$ to keep the latter transmission path "alive". Similarly, an optical service signal received from source 75-2 via port $D_S$ is split such that first and second portions of that signal are supplied via other switch fabric 70-1 connections to output port K for transmission downstream in the East direction as service signal $\lambda_{TSE1}$ and to output port M for transmission in the opposite West direction as protection signal $\lambda_{TPW1}$ to keep the latter transmission path "alive". Thus, the signal received via port $A_S$ ($D_S$) is transmitted as the downstream (upstream) protection signal, rather than the upstream (downstream) protection signal, which is somewhat contrary to the what the prior art does. In this way the connections achieve a higher level of transmission diversity.

Continuing with FIG. 3, conventional power monitor 80-1 receives a small portion of each of the received signals, $\lambda_{RSW1}$, $\lambda_{RPW1}$, $\lambda_{RSE1}$, and $\lambda_{RPE1}$, and is programmed in a conventional manner to perform a number of tests on each such signal to determine if a loss of signal (LOS) has occurred. Such programming declares a LOS for an incoming signal if it meets predetermined criteria (error conditions), including (a) the power level of the incoming signal is below a predetermined threshold; (b) the incoming signal remains at a particular level, e.g., a logical one logical or logical zero, for a predetermined amount of time, e.g., greater than 3.2 seconds; (c) the error rate for the incoming signal exceeds a predetermined error rate; or (d) the signal-to-noise ratio for the incoming signal exceeds a predetermined signal-to-noise ratio. If one of the error conditions occurs, then power monitor 80-1 declares a LOS for the corresponding received signal and notifies local processor 90-1 of the LOS condition and identifies the failed signal, $\lambda_{TPW1}$, $\lambda_{RPW1}$, $\lambda_{RSE1}$, or $\lambda_{RPE1}$, as the case may be. Local processor 90-1 responds to the notification by invoking one of the protection states defined in FIGS. 4A and 4B depending on the number of sources that the module is serving. For example, assume that power monitor 80-1 declares a LOS for signal $\lambda_{RSE1}$ received from the East direction, and notifies local processor 90-1 of the failure via bus 81-1. Also assume that protection module 40-i is serving only one source/client.

To protect against the failure, the source/client could elect to invoke what is commonly referred to as 1+1 protection in the east direction, in which the downstream node transmits the signals upstream in both the service and protection channels. The source then accepts one of those signals. e.g., the signal having the higher Signal-to-Noise Ratio (SNR).

Figure 5:
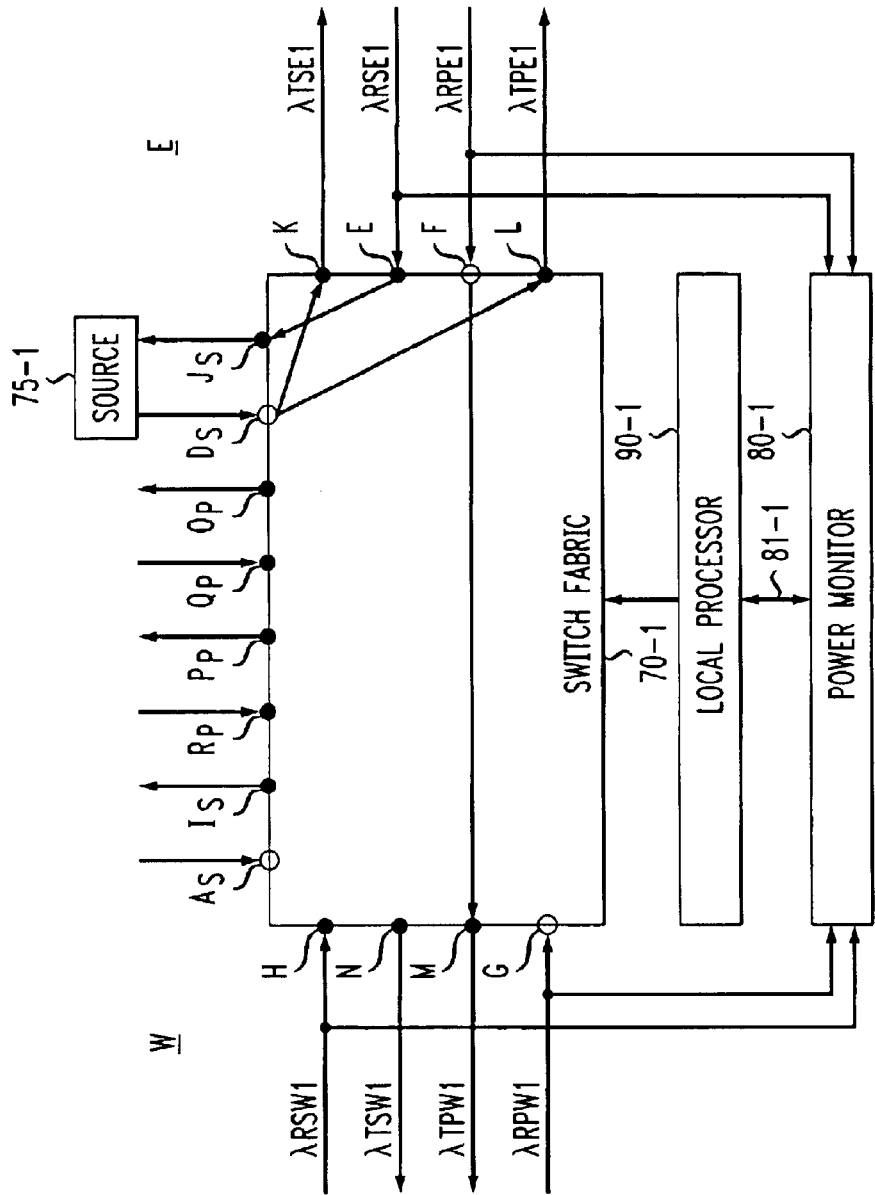
FIGS. 5 through 33 are broad block diagrams illustrating respective ones of the switching states defined in FIGS. 4A and 4B.

To effect 1+1 protection switching for the $\lambda_1$ channel at module 40-i, local processor 90-1 sends appropriate control signals via bus 91-1 to switch fabric 70-1 to effect a one service source 1+1 protection state. State 1 defined in FIG. 4A as a one service channel source 1+1 span protection East ready state, which inherently defines a keep alive state, is one example of 1+1E protection. Fabric 70-1 responds to the processor 90-1 control signals by establishing connections between ports E and J, D and K, D and L, and F and M so that the traffic received from the source via port $D_S$ is transmitted over both the service and protections channels, $\lambda_{TSE1}$ and $\lambda_{TPE1}$. The switch fabric supplies the upstream traffic received via port E to output port $J_S$, as shown in FIG. 5. The connection from port F to port M effects a "keep alive" state for the protection traffic received via port F. (Note that individual ones of the input and output ports are "optically wired" to one another to simplify the design of switch fabric 70-1. Examples such direct connections is the direct connection from port $A_S$ to port N, and the direct connection from port $D_S$ to port K. The signals carried over such connections, however, do not interfere with other signals. Thus, switch fabric 70-1 includes direct connections as well as controllable connection.)

Figure 6:
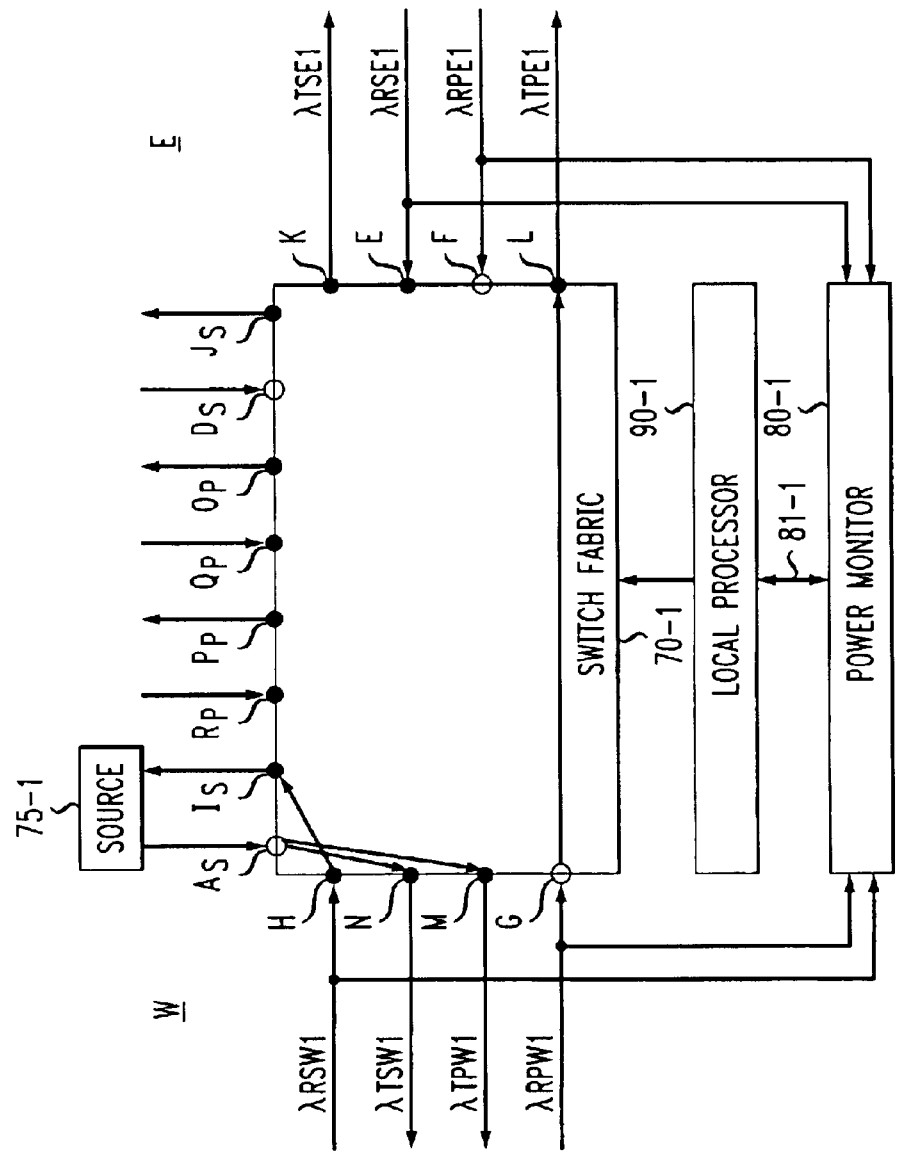

If module 40-i is within node 200-1 of FIG. 1, then node 200-1 effects state 1 and the downstream node, i.e., node 200-4, communicating upstream in a westerly direction with node 200-1, effects the one service channel source, 1+1 span protection West ready protection state defined as state 2 in FIG. 4 and illustrated in FIG. 6. Similarly, state 2 inherently includes a "keep alive" function, For the sake of brevity and clarity, the connections and operation of the one source 1+1W transmission/protection state will not be discussed herein since it is a mirror image of the one source 1+1E transmission/protection state 1. It suffices to say, however, that module 40-j receives the service traffic in a 1+1 manner as intended over both the service channel, $\lambda_{RSW1}$, via port H and the protection channel, $\lambda_{RPW1}$, via port G and fabric 70-1.

Figure 7:
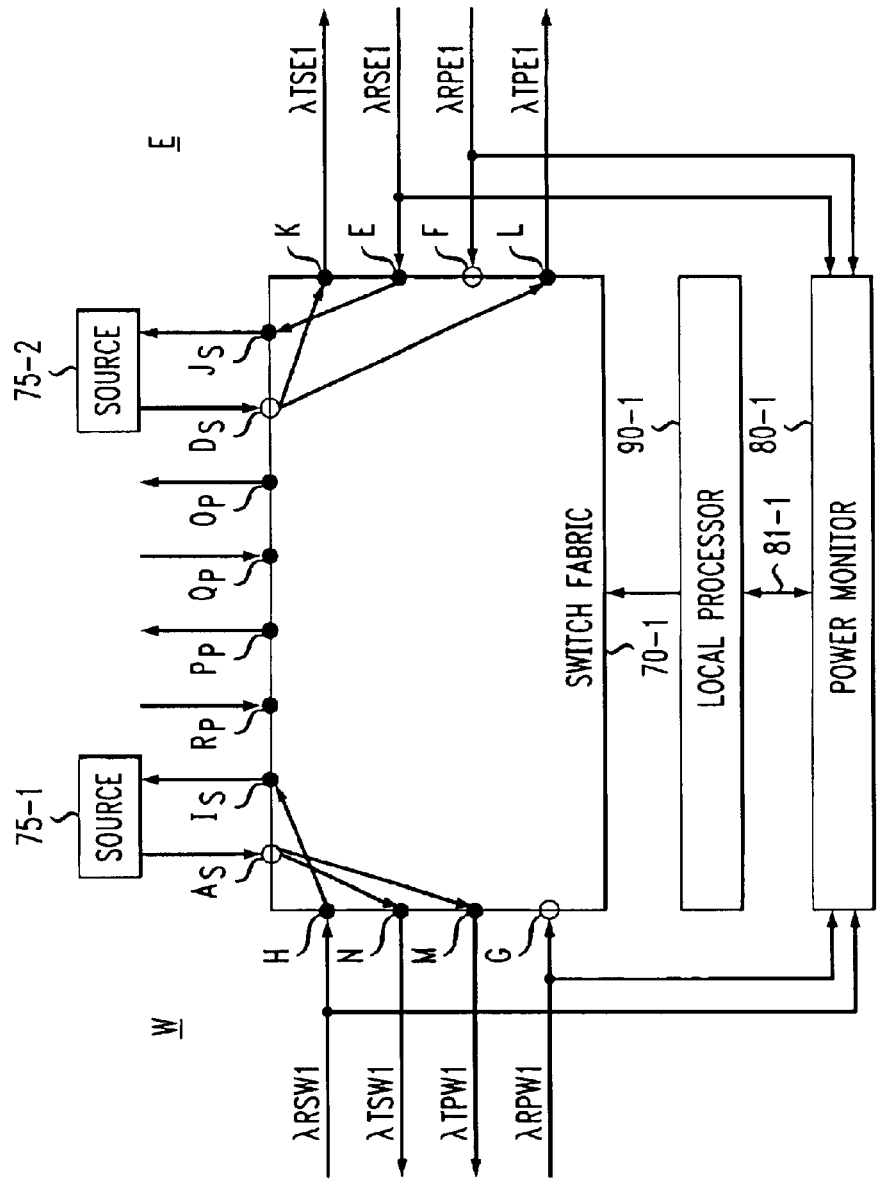

Transmission and protection state 3 effects 1+1 protection switching for a two source arrangement, as shown in FIG. 7. This protection feature is defined in FIG. 4A as "two service channel sources 1+1 span protection East ready, and 1+1 span protection West ready". Source 75-1, more particularly, communicates upstream in the westerly direction with another source that most likely subscribes to 1+1E protection switching. As such, the upstream source/protection module transmits optical signals downstream in channel $\lambda_{RSW1}$ received via port H and a copy of the signals in channel $\lambda_{RPW1}$ received via port G. The optical signals are presented to source 75-1 via ports $I_S$ and $P_P$, respectively. Source 75-1, in the manner discussed above, accepts one of the received signals, e.g., the signals having the better SNR, and rejects the other signals, as is done conventionally in 1+1 protection switching. Similarly, optical service signals received from source 75-1 via port $A_S$ are split by a splitter disposed thereat (represented by the circle at $A_S$, as mentioned above) and outputted to channels $\lambda_{TSW1}$ and $\lambda_{TPW1}$ channels, respectively, for transmission to the upstream node via the associated optical transmission equipment.

Source 75-2, FIG. 7, similarly communicates with a downstream source (not shown) in the Easterly direction in essentially the same way. For the sake of clarity and brevity, since the latter switching is similar to that provided to source 75-1 it will not be discussed herein.

Local processor 90-1 in each protection module is also arranged to notify maintenance controller 95 via bus 96, FIG. 2, of a failure (such as a loss of signal, e.g., loss of signal $\lambda_{RSE1}$), and that protection switching is being invoked. Maintenance controller 95 responsive to such notification forms a message identifying the failure and sends the message via the system control channel in both directions (East and West) to each of the other nodes. The maintenance controller 95 in each upstream node, e.g., node 200-2, responds to receipt of the message by invoking the necessary protection switching, if needed, and retransmitting the message upstream via the control channel. In this way, the control channel message will be transported in a counterclockwise direction (upstream) to a downstream node, e.g., 200-4. Node 200-4 upon receipt of the message is thus notified of the service path failure, $\lambda_{RSE1}$, and, invokes the appropriate protection switching, as will be further discussed below.

Figure 8:
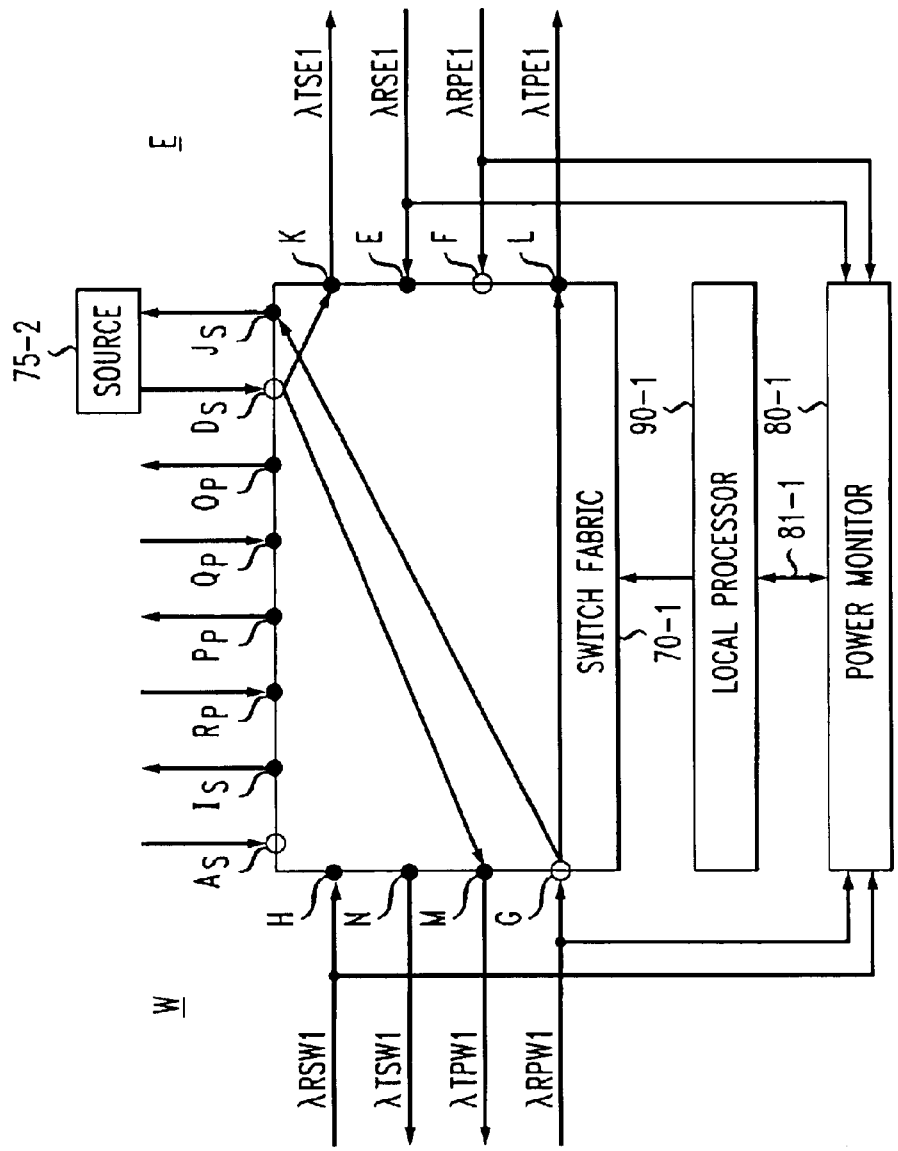
Figure 9:
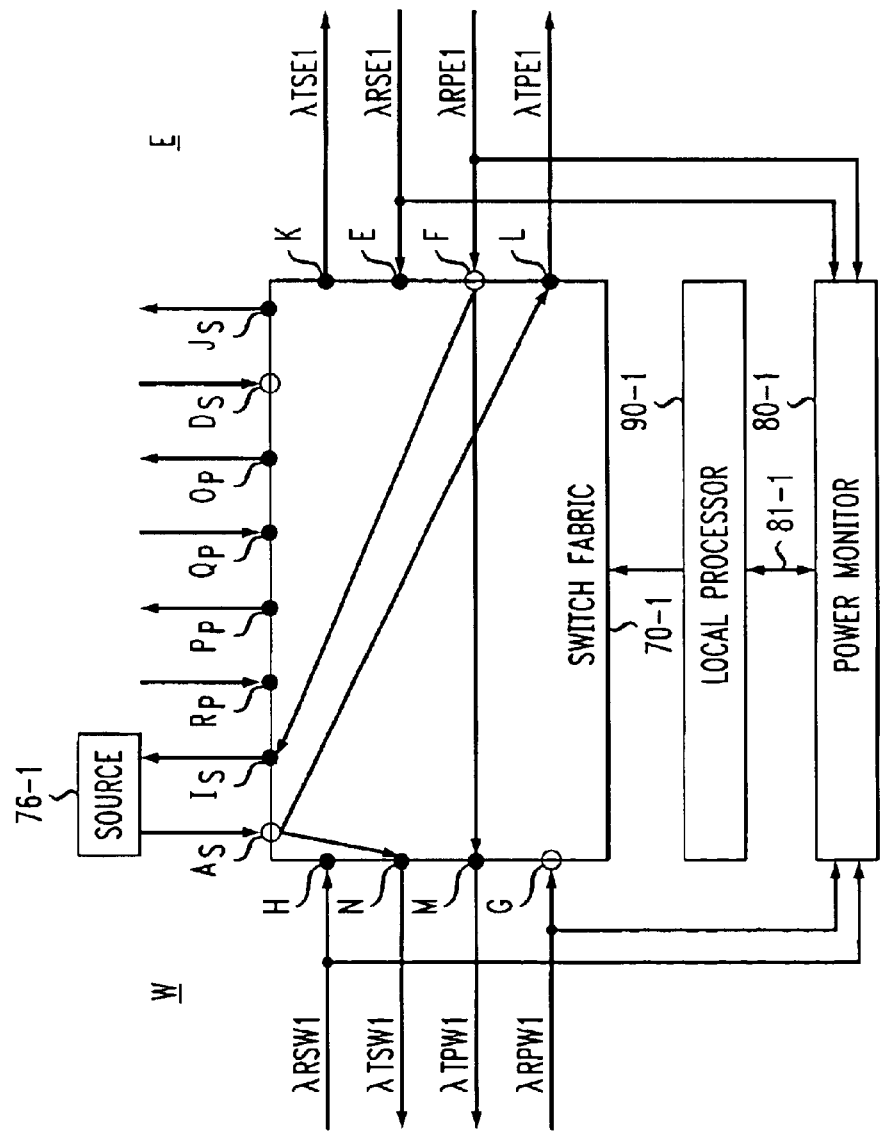

System 100 also provides a protection state that we call "one service channel source, path diverse 1+1 span protection" defined as protection states 4 and 5 in FIG. 4. In span protection, information received via a protection channel in the opposite direction is "dropped" (supplied) to the respective source. That is, information exchanged between a downstream source and upstream source is transported over the respective service channel and a copy of the information is transported in the opposite direction over the corresponding protection channel as shown in FIG. 8 for the upstream protection module 40-i. Specifically, optical signals received from source 75-2 received via input port $D_s$ are directed via fabric 70-1 to output port K where they are outputted as service traffic $\lambda_{TKSE1}$ for transmission in the East direction by the associated optical equipment to the downstream node. A copy of the optical signals are also supplied to output port M by virtue of the signal splitter disposed at port $D_s$ and controllable switch fabric connections established between port $D_s$ and output M. The latter signals are transported as protection signals $\lambda_{TPW1}$ upstream in the West direction by the associated optical equipment to the next intervening upstream node. The corresponding protection module in the upstream node would have invoked a pass through connection from input port F to output port M in the corresponding switch fabric 70-1 contained therein. Thus, optical signals AREA are passed directly through the latter protection module to output port M, where they are then transported to the next intervening upstream node. Similarly, the corresponding protection module in that node effects the same pass through connection so that it can supply (pass) the signals that it receives via port F directly to output port M for transmission to the next intervening node, and so on. When the signals are received via port F of the downstream protection module 40-j, FIG. 9, communicating with protection module 40-i they are dropped via a fabric 70-1 controllable connection from port F connected to the protection channel to port $I_s$ connected to source 76-1.

Similarly, optical signals received from source 76-1 received via input port $A_s$ are directed via fabric 70-1 of module 40-j to output port N where they are outputted as service traffic $\lambda_{TKSW1}$ for transmission in the West direction by the associated optical equipment to the upstream node. A copy of the optical signals are also supplied to output port L by virtue of the signal splitter disposed at port $A_s$ and controllable switch fabric 70-1 connections established between port $A_s$ and output L. The latter signals are transported as protection signals $\lambda_{TPE1}$ downstream in the East direction by the associated optical equipment to the next intervening downstream node. Similarly, the corresponding protection module in the downstream node would have invoked a pass through connection from input port G to output port L in the corresponding switch fabric 70-1 contained therein. Thus, optical signals $\lambda_{TPE1}$ are passed directly through the latter protection module to output port L, where they are then transported to the next intervening downstream node, and so on. Similarly, when the signals are received via port G of the protection module 40-i, FIG. 8, communicating with protection module 40-j, they are dropped via a fabric 70-1 controllable connection from port G connected to port $I_s$ connected to source 75-2. Thus, in this protection scheme, protection traffic is transported in the opposite/diverse direction around the ring to a destination, which is different from what is done in the prior art.

Assume that a protection module is serving two independent sources in which the source communicating in the East direction with a downstream source experiences a ring failure. As discussed above, local processor 90-1 would be notified (by either power monitor 80-1 or the node maintenance controller 95) that a downstream ring failure (e.g., ring failure east) has occurred, due to, for example, a cable cut carrying downstream paths $\lambda_{TSE1}$, $\lambda_{RSE1}$, $\lambda_{RPE1}$ and $\lambda_{TPE1}$, which affects the communications exchanged between the upstream source, e.g., source 75-2, FIG. 10, and a downstream source. Local processor 90-1 in module 40-i, responsive to such notification, effects what we call a "two service channel path diverse 1+1 span protection East active, normal operation West" protection scheme, defined as protection state 6 in FIG. 4A. To effect state 6, local processor 90-1, FIG. 10, directs switch fabric 70-1 to controllably disconnect (a) port $A_S$ from West protection output port M, (b) port $P_P$ from West input protection port G, and (c) port $O_P$ from East input protection port F. Switch fabric 70-1 is also controllably directed to switch the source 75-2 information signal split at port $D_S$ and supplied to East output port L to West output port M, and to switch the West input signal split at input protection port G from port $P_P$ to port $J_S$ and East output protection port L for "keep alive" purposes.

Figure 10:
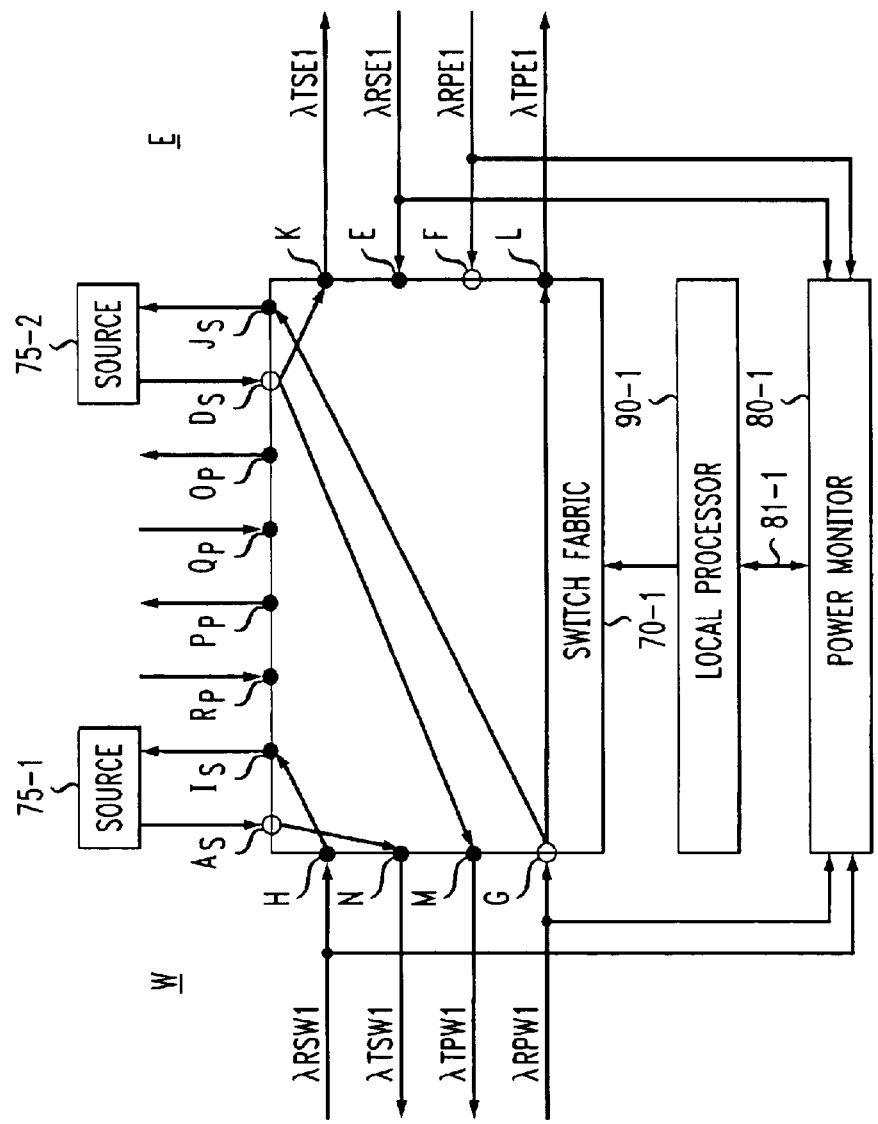
Figure 11:
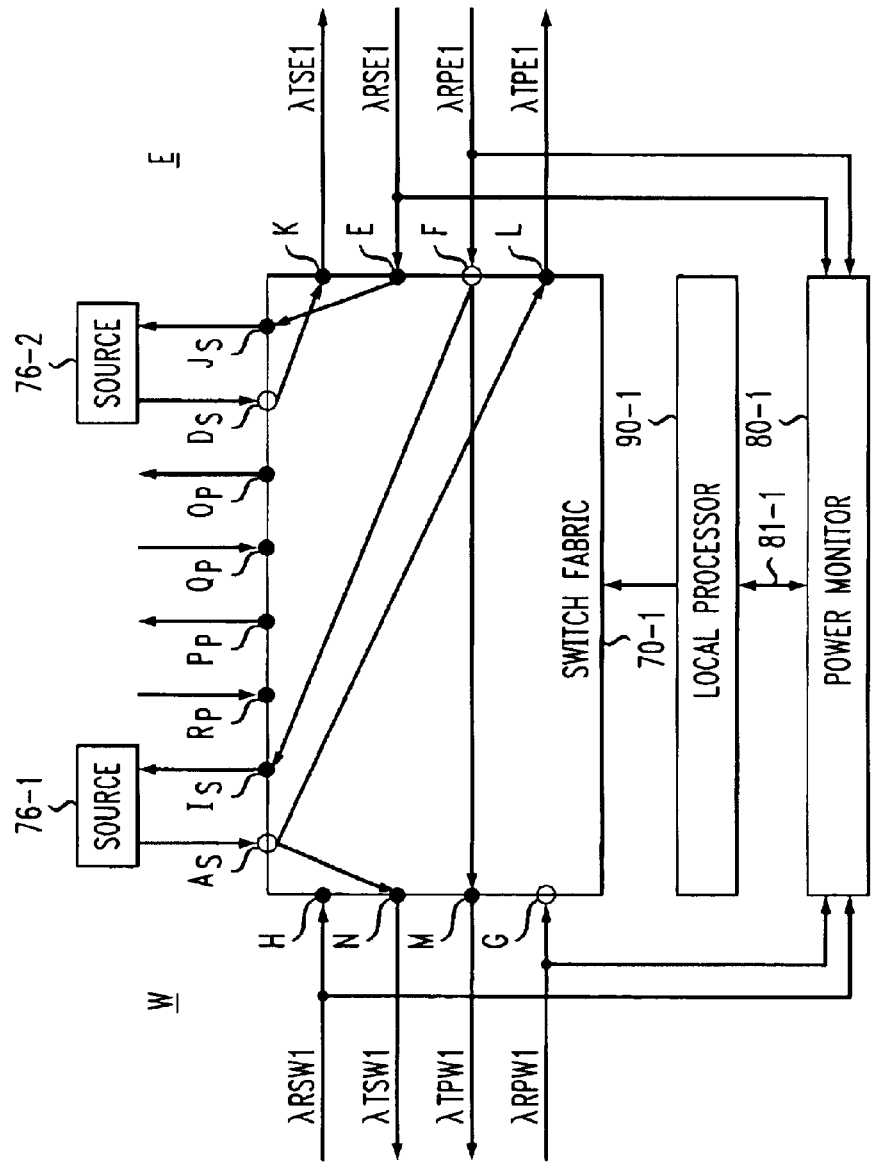

The local processor 90-1 in the downstream protection module 40-j, FIG. 11, that is communicating with source 75-2, FIG. 10, is directed in the described way to effect a "two service channel path diverse 1+1 span protection West active, normal operation East" protection state, listed as state 7 in FIG. 4A. For the sake of clarity and brevity, state 7, shown in FIG. 11, will not be discussed herein since it is a mirror image of state 6, shown in FIG. 10 and somewhat similar to FIG. 9. It suffices to say, however, that once the downstream module 40-i effects state 7, and the intervening nodes 200 effect their respect pass through states, then communications between the affected sources may resume, but in opposite directions around the ring. That is, source 75-2 transmits and receives information around the ring via the West direction and the downstream source 76-1 transmits and receives information around the ring via the East direction. Source 76-2 and source 75-2 transmit and receive in a conventional manner, i.e., via the service paths. Thus, in accordance with an aspect of the invention, a protection module 40 may support a plurality of independent sources according each source a different transmission or protection scheme, as will be further discussed below.

Figure 12:
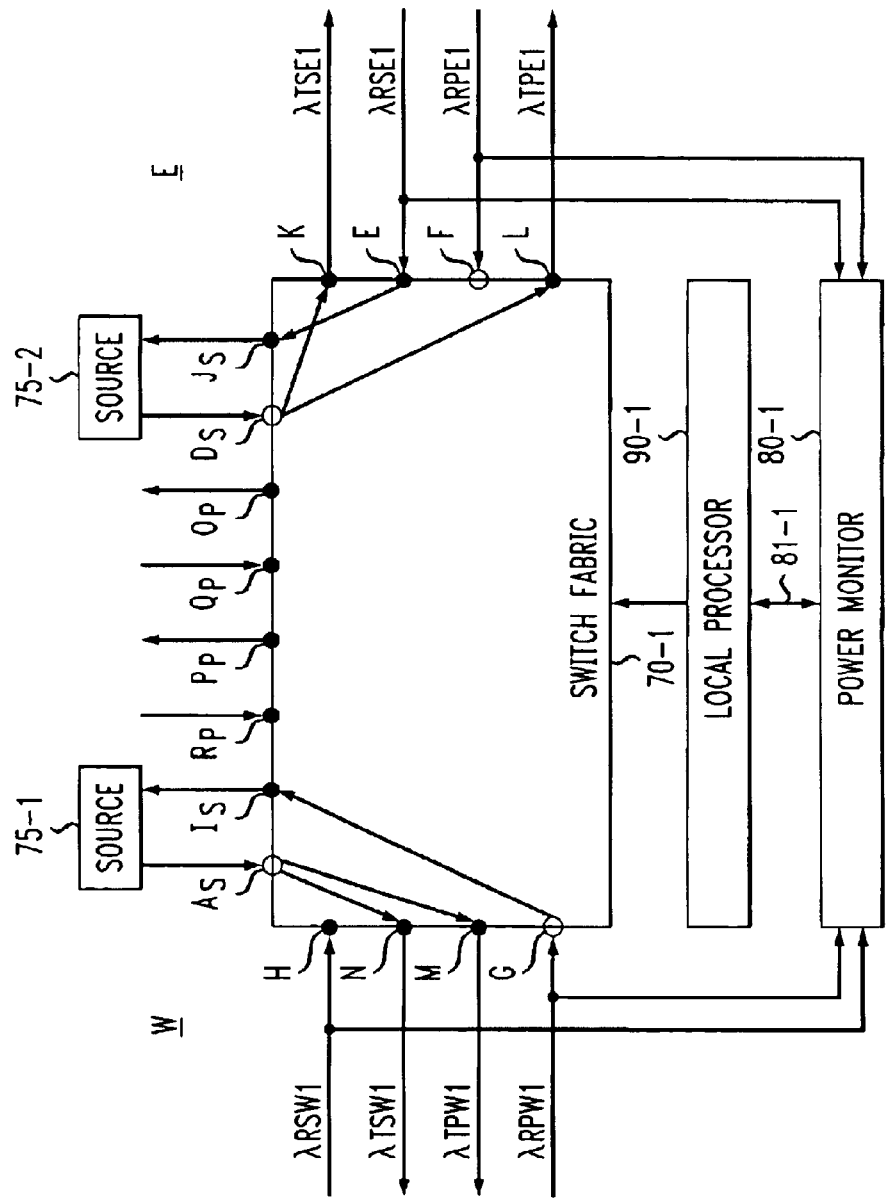

Assume that a protection module is still serving two independent sources each subscribing to what we call 1+1, with 0×1 protection switching. Also assume that an upstream source is communicating with a downstream source, in which each such source is transmitting over the respective service and protection channels but only accepting the traffic received over the service channel. Further assume that a failure occurs in the service channel, $\lambda_{RSW1}$, affecting communications between, for example, source 75-1, FIG. 12, and an upstream source 76-1, FIG. 13. In the manner discussed above, power monitor 80-1 detects the failure and reports the failure to local processor 90-1. Local processor 90-1, FIG. 12, in turn, effects "two service channel source, 1+1 span protection East ready, 1+1 span protection West active" protection switching, defined as protection state 8 in FIG. 4A, if the sources/clients subscribe to that scheme. To effect state 8, local processor 90-1, FIG. 12, directs switch fabric 70-1 to "drop" the signal incoming at protection port G to port $I_S$. In addition, local processor 40-1 reports the failure to its node maintenance controller 95 via bus 96, FIG. 2. Maintenance controller 95, in turn, forms a message identifying the problem and the action taken by the protection module and forwards the message via the maintenance channel to the other nodes forming the respective transmission ring.

Figure 13:
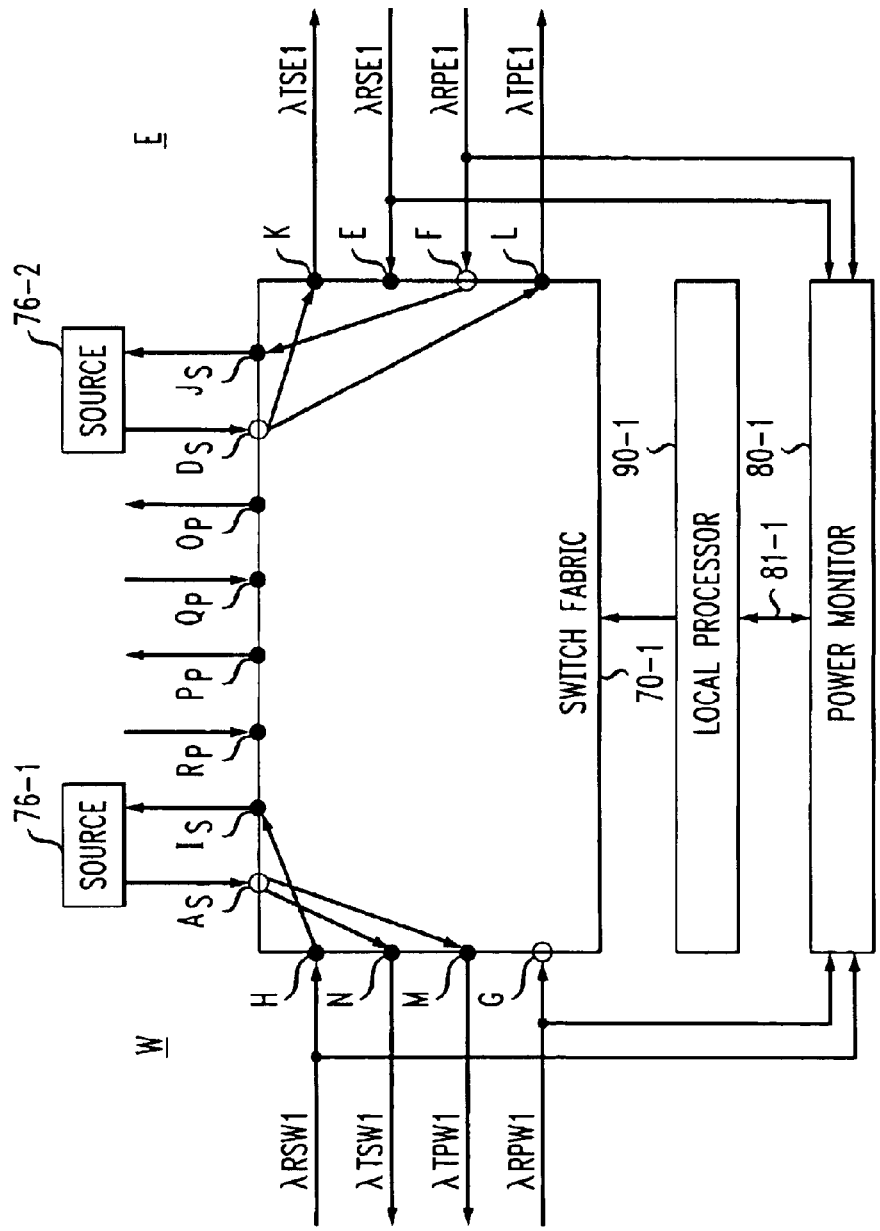

The corresponding upstream protection module 40-j, FIG. 13, responsive to its power monitor 80-1 detecting the failure or responsive to notification of the failure via its node maintenance controller 95 (FIG. 2), effects "two service channel source, 1+1 span protection West ready, 1+1 span protection East active" protection switching (state 9, FIG. 4A) by "dropping" the protection channel incoming at port F to the service port $J_S$ via a switch fabric 70-1 controllable connection invoked by local processor 90-1. In addition, local processor 90-1 directs switch fabric 70-1 to connect one of the split signals at input port $D_S$ for transmission downstream via the protection path connected to the latter port. The signals carried in the latter path/channel are received at input port G of the downstream protection module 40-i, FIG. 12, where they are supplied to source 75-1 via a controllable switch fabric 70-1 connection to port $I_S$ connected to source 75-1.

A particular feature of the invention allows a source served by a protection module to transport so-called pre-emptory traffic (e.g., low-priority secondary traffic) over the protection channels and simultaneously transport service traffic (e.g., high-priority primary traffic/data) over the service channels. If a service channel fails, for whatever reason, then the associated local processor 90-1 directs the associated switch fabric 70-1 to disconnect the pre-emptory traffic from the corresponding protection channel and connect the protection channel to the port receiving the primary traffic from the respective one of the sources. We call one example of this feature "multiple (e.g., two) service channel sources, 1+1 span protection East active, protection access West", which is defined as state 10 and similarly defined as state 11 in FIG. 4A and shown in FIGS. 14 and 15, respectively.

Figure 14:
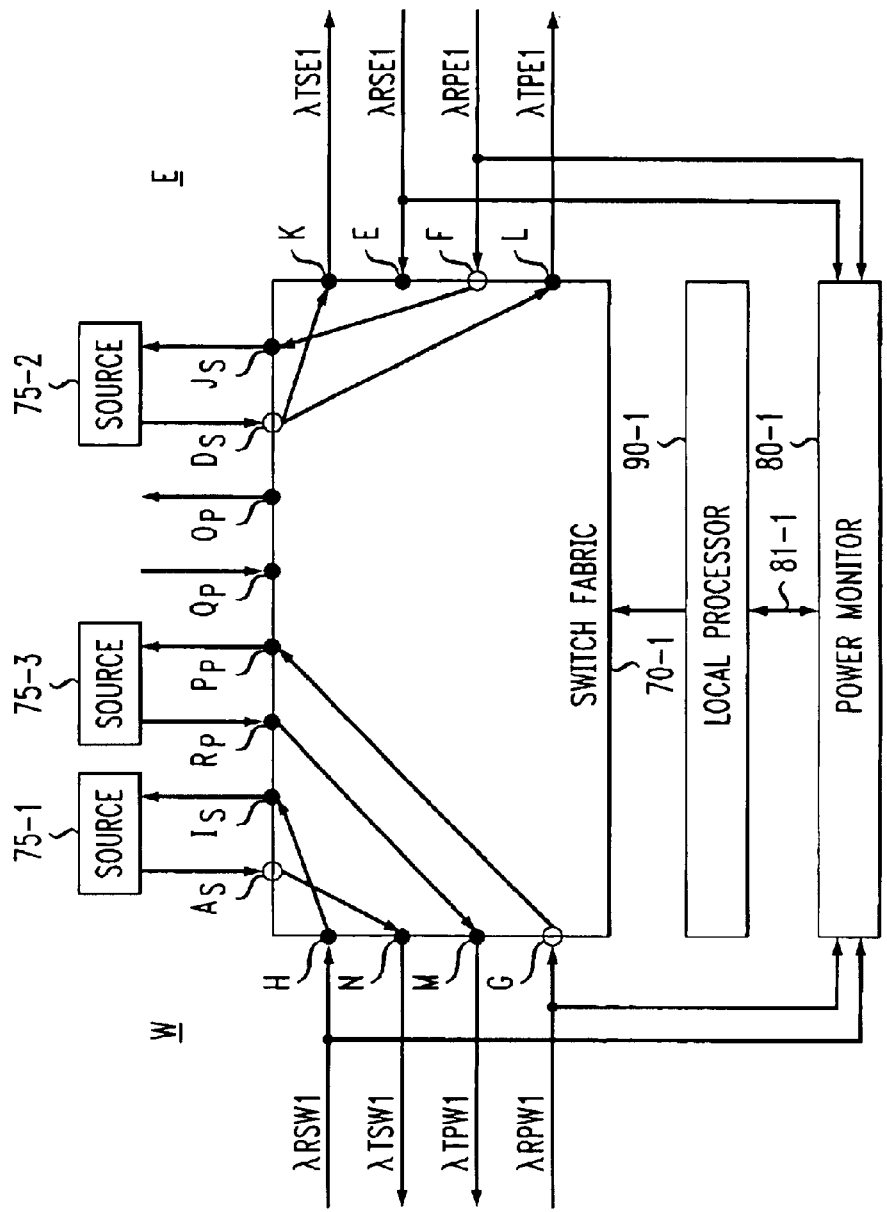

Specifically, controllable connections established within switch fabric 70-1, FIG. 14, allow source 75-1 to exchange both service and pre-emptory traffic via the service and protection channels, $\lambda_{RSW1}$, $\lambda_{TSW1}$, $\lambda_{TPW1}$ and $\lambda_{RPW1}$, with a corresponding upstream protection module. Assuming that similar connections had been established in the East direction so that source 75-2 could exchange both service and pre-emptory traffic with a corresponding downstream protection module. However, in that case, it is also assumed that path $\lambda_{RSE1}$ failed, which prompted local processor 90-1 to direct switch fabric 70-1 to switch input port F from port $O_P$ to port $J_S$ so that the protection channel, $\lambda_{RPE1}$, could be used to transport service traffic as shown in FIG. 14.

Figure 15:
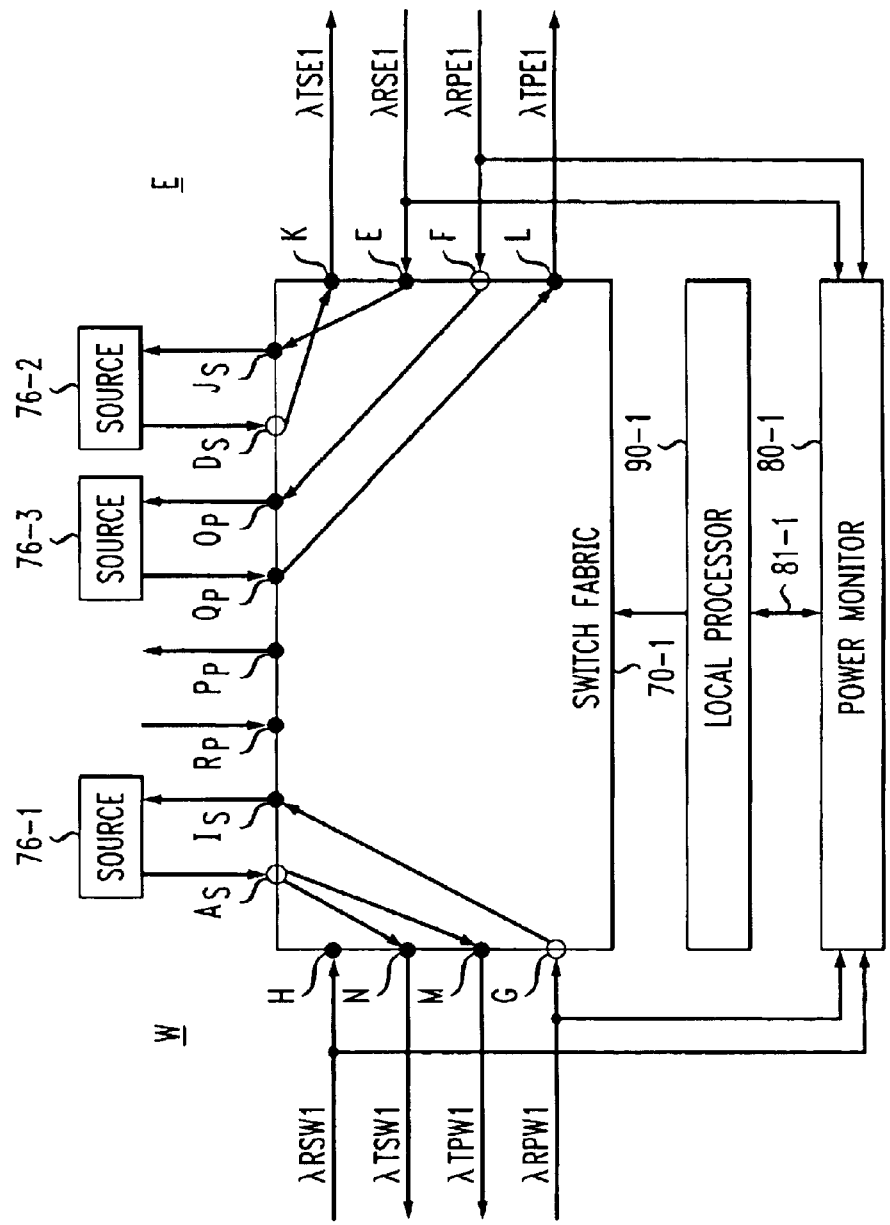

FIG. 15 shows that switch fabric 70-1 in module 40-j is configured to allow source 76-1 to similarly exchange both service and pre-emptory traffic with a corresponding protection module in a downstream node. FIG. 15 also shows that the input port G was switched from port $R_P$ to service port $I_S$ so that service traffic supplied by source 75-2, FIG. 14, to protection channel $\lambda_{RPE1}$ (designated $\lambda_{RPW1}$ in FIG. 15) can be delivered to source 76-1, as intended, all in accordance with the principles of the invention.

As discussed above in connection with protection states 8 and 9, 1+1 switching is effected in the West direction so that one source may drop the service channel and 0×1 switching is effected in the East direction so that the other source may drop the protection channel when a LOS failure is detected at module 40-i. If both of those modules detect a failure, then both modules effect protection state 12, FIG. 4A.

Figure 16:
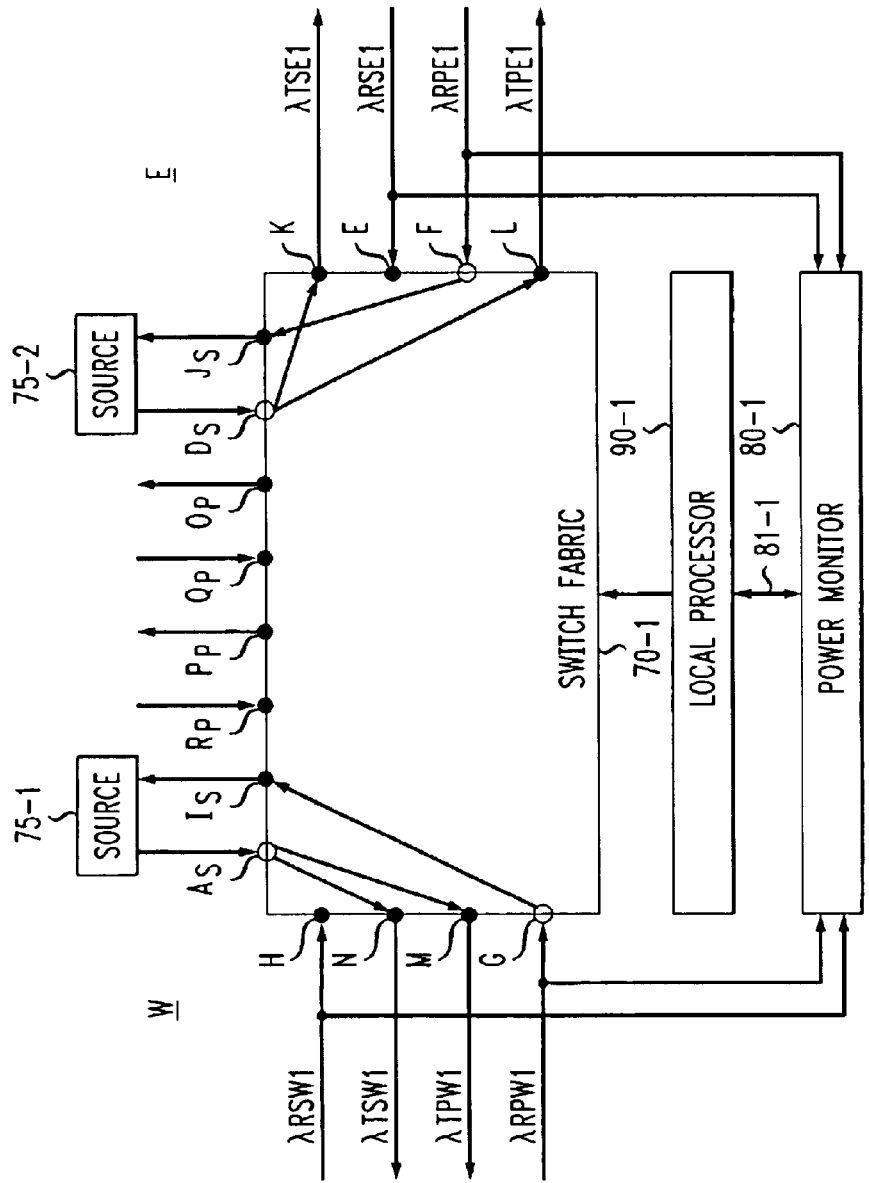

As shown in FIG. 16, source 75-1, for example, drops the protection channel received via port G to output port $I_S$ and transmits traffic upstream over both the service and protection channels (i.e. 1+1 switching) via output ports N and M. Similarly, Source 75-2 drops the protection channel received via port F to output port $J_S$ and transmits traffic downstream over both the service and protection channels (i.e., 1+1 switching) via ports K and L, respectively.

Figure 17:
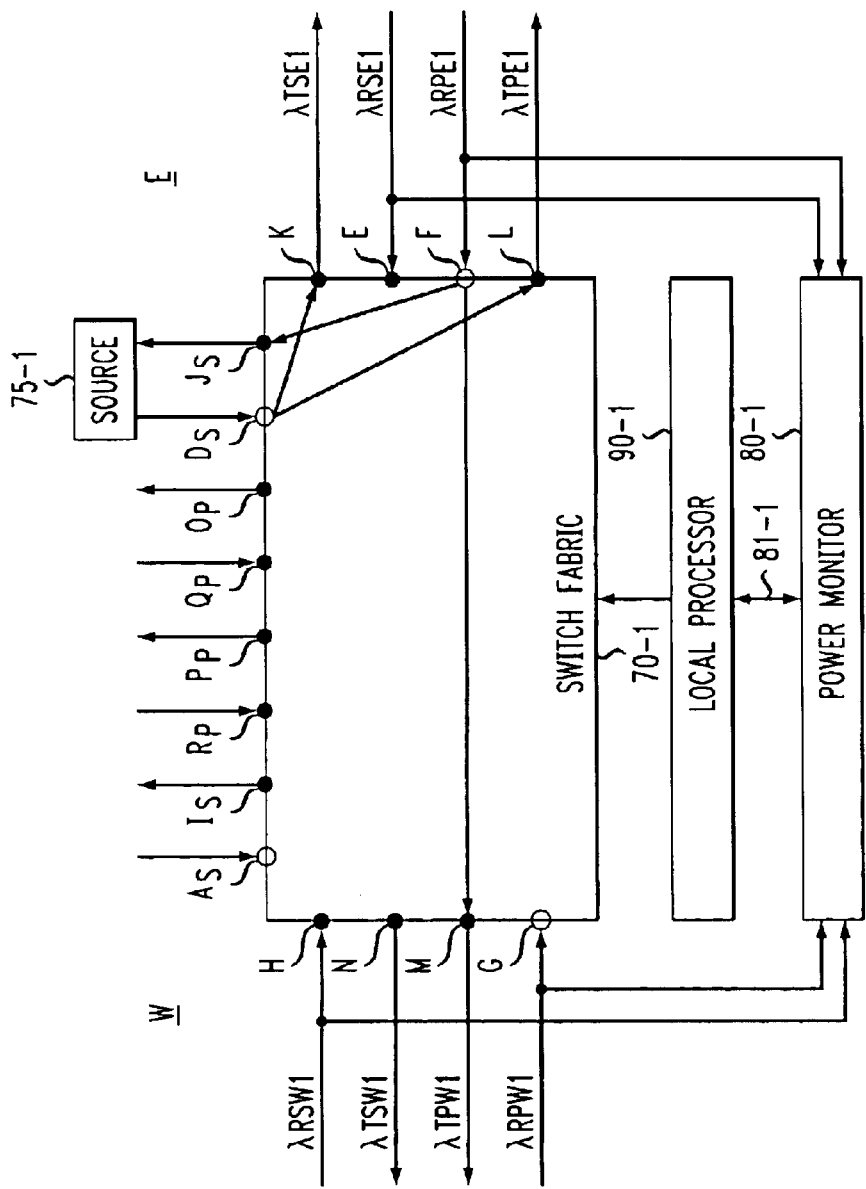

Assume now that optical protection module 40-i (FIG. 17) is serving a single source, that the customer/source subscribes to span protection with "keep alive" for the protection channel and that power monitor 80-1 declares a LOS via path 81-1 for channel signal $\lambda_{RSE1}$. Local processor 90-1, in response thereto, effects the span protection state for a single source. State 13 is defined as one service channel source, 1+1 span protection East active protection state for the module transmitting in the East direction. State 14 is similarly defined in FIG. 4A for the module transmitting in the West direction. For these states, the service traffic signals are redirected from the service channel, $\lambda_{TSE1}$, to the corresponding protection channel, $\lambda_{TPE1}$, by sending appropriate control signals to switch fabric 70-1 to effect the required connections. The control signals cause switch fabric 70-1 to clear the current access state and establish the thirteenth protection state (FIG. 4), namely, span protection (0×1E) for the module transmitting in the East direction (upstream module). Accordingly, switch fabric 70-1 establishes connections from incoming port F to both source output port $J_S$ and to output M so that the signals arriving at port F via the corresponding protection are dropped to source 75-1 and supplied upstream to keep the protection channel "alive", as shown in FIG. 17. Fabric 70-1 also establishes a connection between port $D_S$ and output port L so that information signals supplied by source 75-1 are transmitted downstream via the protection channel to the module transmitting in the West direction (upstream).

Figure 18:
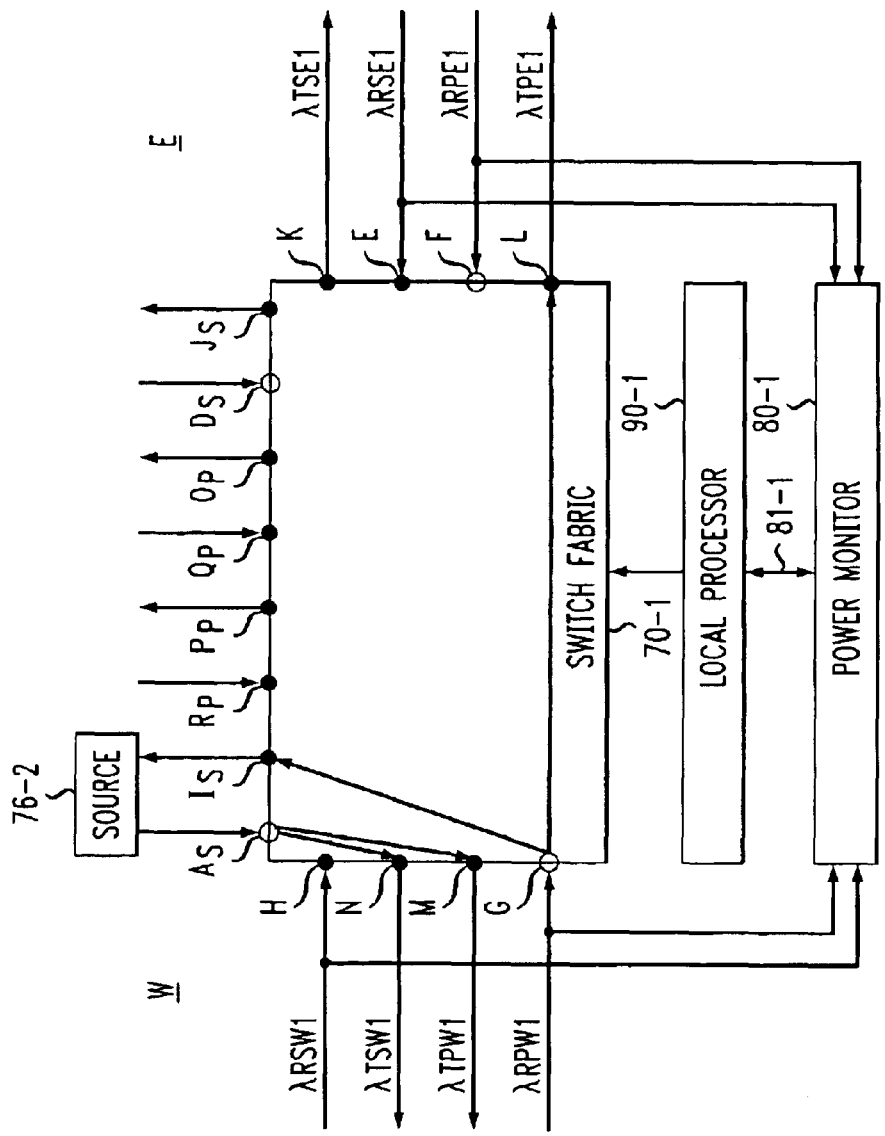

FIG. 18 shows the connections that are established in the downstream module 40-j to effect span protection for source 76-2. Local processor 90-1 in module 40-j effects such span protection as a result of either detecting the failure or being so notified via the control channel in the manner discussed above. The connections, as defined by state 14, FIG. 4A, include a switch fabric 70-1 controllable connection from the signal splitter at input port $A_S$ to output port M so that the signals supplied by source 76-2 are delivered upstream to module 40-i via protection channel $\lambda_{TPW1}$. Such connections also include disconnecting port H from port $I_S$ then establishing switch fabric controllable connections respectively from the port G signal splitter to output port L to effect the keep alive function and to output source port $I_S$ so that the signals arriving via the protection from the upstream module, channel $\lambda_{RPW1}$, may be dropped to source 70-2 rather than the signals appearing at service port H.

Figure 19:
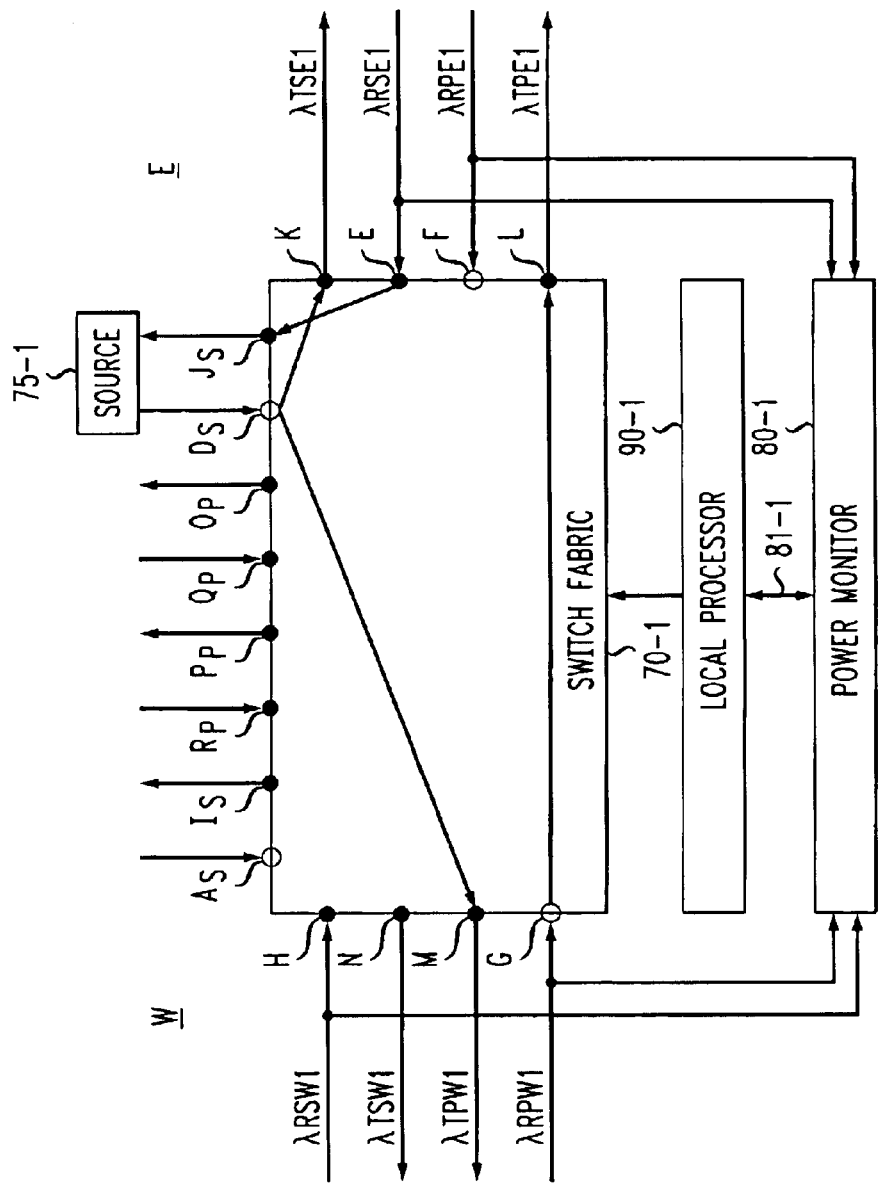
Figure 20:
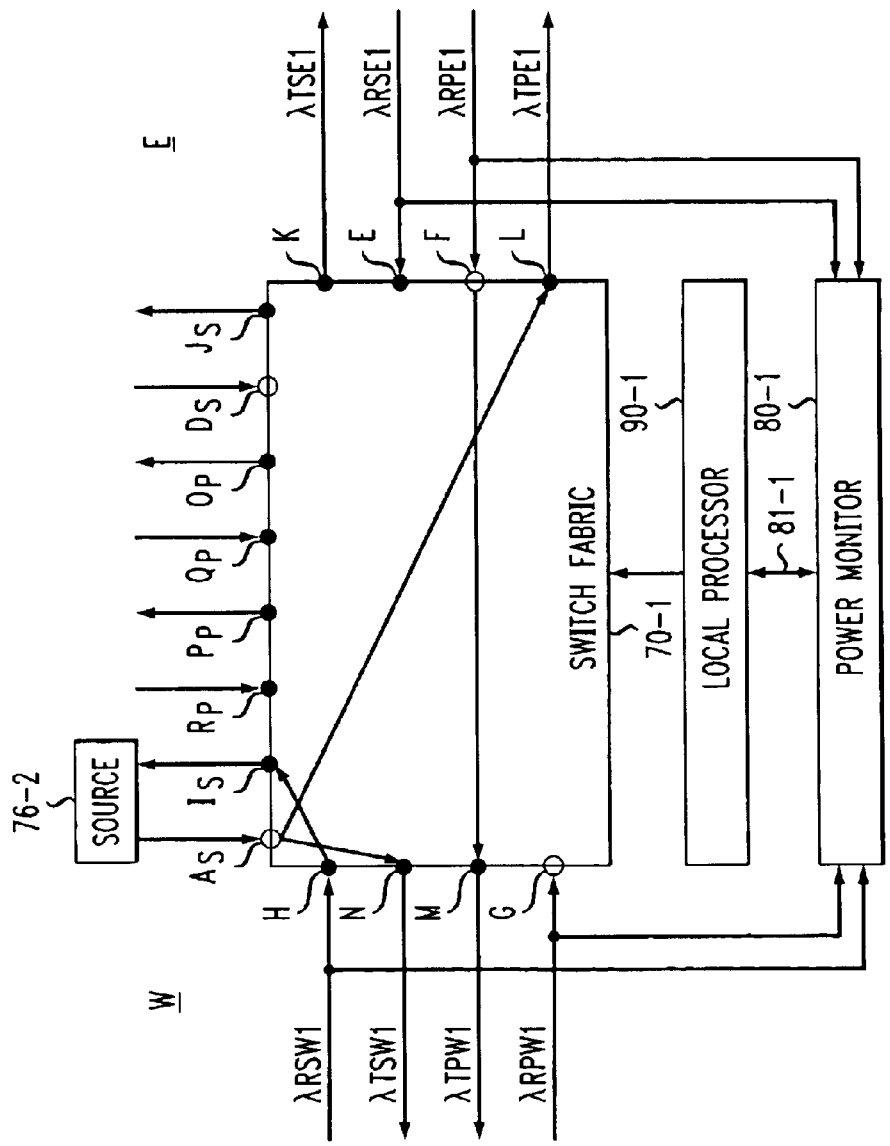

A simple transmission state for a single source that is transmitting and receiving over the service channels is defined in FIG. 4A as transmission state 15 for a source transmitting in the E direction and state 16 for a source transmitting in the W direction, respectively. Transmission states 15 and 16 also define a "keep alive" function for the purpose of keeping the protection channel alive as respectively shown in FIGS. 19 and 20. In FIG. 19, signals originated by upstream source 75-1 are supplied to the signal splitter at port $D_S$. A direct connection from that splitter to port K supplies the signals to service channel $\lambda_{TSE1}$ for delivery to the downstream module. A controllable connection established by switch fabric 70-1 in the described manner also connects the splitter at port $D_S$ to output port M. The signals supplied to port M traverses the transmission ring in a counter-clockwise direction for the purpose keeping the upstream protection channel, $\lambda_{TPW1}$, alive. Switch fabric 70-1 establishes two other controllable connection, one from port C to port L to effect a pass through function to also keep the downstream protection channel, $\lambda_{TPE1}$, alive, and one from incoming port E to output service port $J_S$ to drop the signals carried in the incoming service channel, $\lambda_{RSE1}$, to source 75-1.

As mentioned above, FIG. 20 shows the switch fabric 70-1 connections that are established to effect transmission state 16 in the downstream module that is transmitting in the West direction. For the sake of brevity and clarity these connection will not be discussed herein since they somewhat mirror the connections established by module 40-i, FIG. 19.

(Note that transmission state 17 was discussed above in connection with FIG. 3.)

Figure 21:
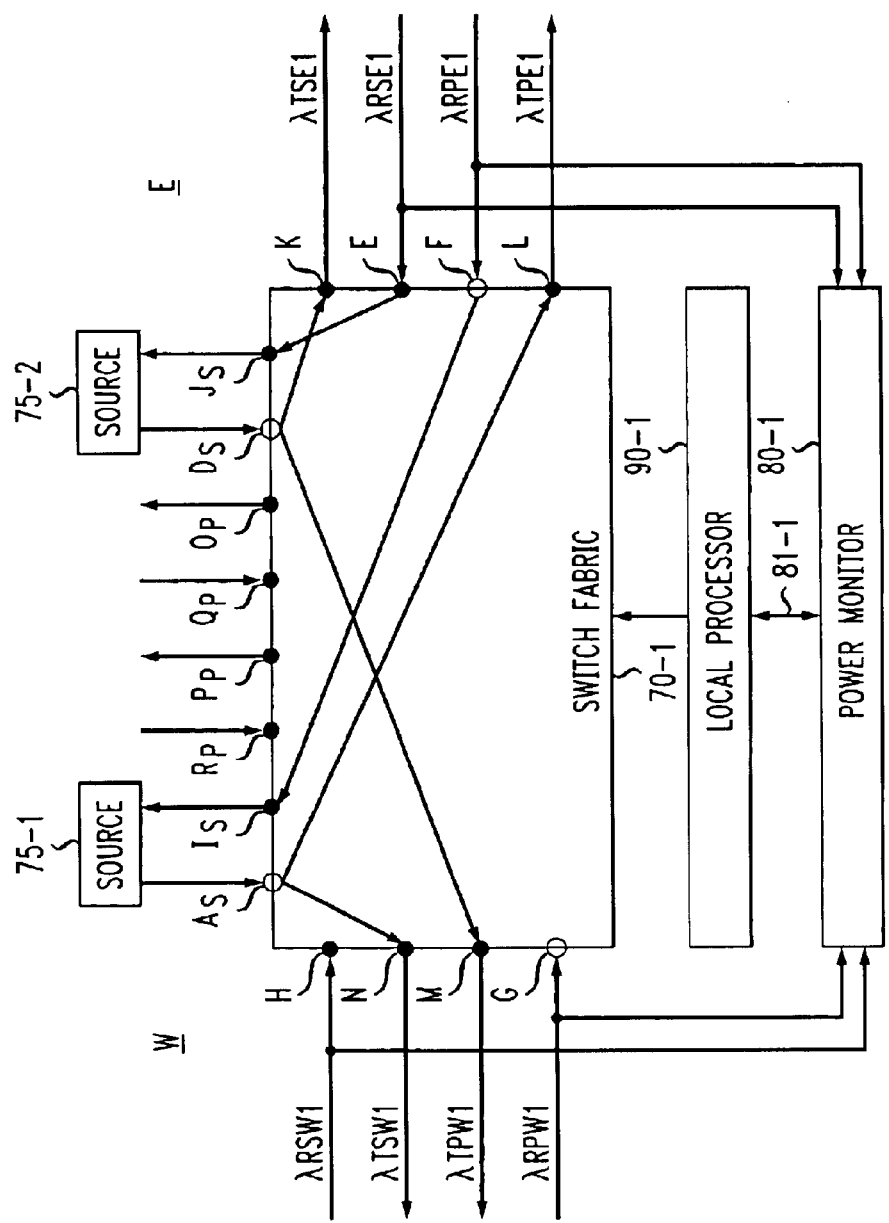

As mentioned above in connection with path protection estates 4 and 5 for a single source (FIGS. 8 and 9, respectively), data supplied by a source is sent over the service channel and a copy of the data is sent over the protection channel in the opposite direction, and data received over the protection channel in the opposite direction is supplied (dropped) to the source. Such path protection may be effected in the case where a protection module supports two sources, respectively defined as states 18 and 19 in FIG. 4B for the West and East directions. The switching fabric 70-1 connections effecting protection state 18 for a module supporting two sources is shown in FIG. 21, and is defined in FIG. 4B as two service channel sources, path diverse 1+1 span protection West active, path diverse 1+1 span protection East ready. As shown, the data supplied by sources 75-1 and 75-2 is split at ports $A_S$ and $D_S$, respectively. The split data at port $A_S$ is connected directly to service port N and controllably connected via switching fabric 70-1 to protection port L so that the data is sent, in accordance with one aspect of the invention, in one direction via service channel $\lambda_{TSW1}$ and in an opposite direction via protection channel $\lambda_{TPE1}$. Similarly, the split data at port $D_S$ is connected directly to service port K and controllably connected via switching fabric 70-1 to protection port M so that that data may be sent in one direction via service channel $\lambda_{TSE1}$ and in an opposite direction via protection channel $\lambda_{TPW1}$. The data that is received via protection port F (i.e., the data transmitted by via port L, FIG. 22.) is dropped to output port $I_S$ for delivery to source 75-1 communicating in the West direction. The data that is received via service port is dropped to output service port $J_S$ source for delivery to source 75-2.

Figure 22:
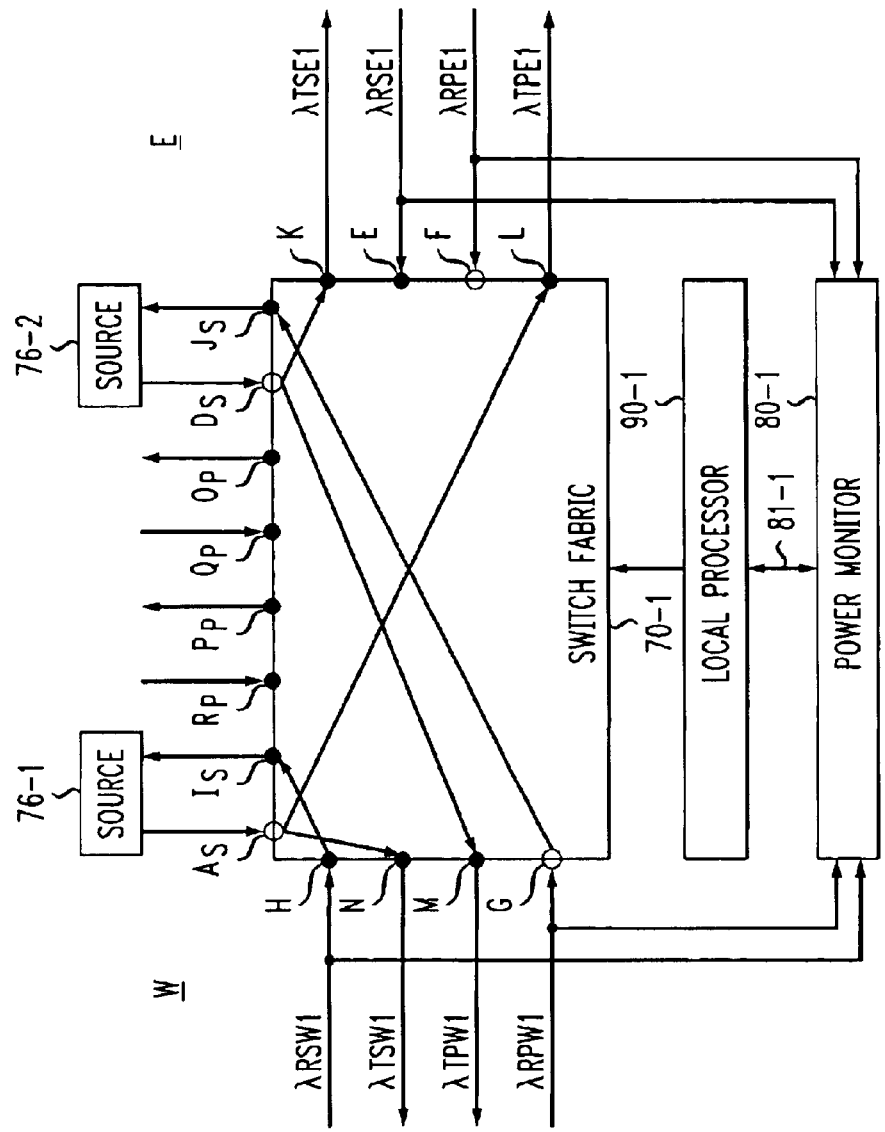

FIG. 22 illustrates the connections specified for state 19 that are established to implement a two service channel sources, path diverse 1+1 span protection East active, path diverse 1+1 span protection West ready protection state in the East direction. As shown, the data supplied by sources 76-1 and 76-2 is similarly split at ports $A_S$ and $D_S$, respectively. The split data at port $A_S$ is then directly connected to service port N and controllably connected via connected via switching fabric 70-1 to protection port L so that the data is sent in one direction via the service channel and in an opposite direction via the protection channel. Similarly, The split data at port $D_S$ is directly connected to service port K and controllably connected via switching fabric 70-1 to protection port M so that the data may be sent in one direction via the service channel and in an opposite direction via the protection channel. The data that is received via protection port G (i.e., the data transmitted by via port L, FIG. 21) is dropped to output port $J_S$ for delivery to source 76-2 communicating in the East direction. The data that is received via service port H is dropped to output $I_S$ for delivery to source 76-1, all in accordance with an aspect of the invention.

Figure 23:
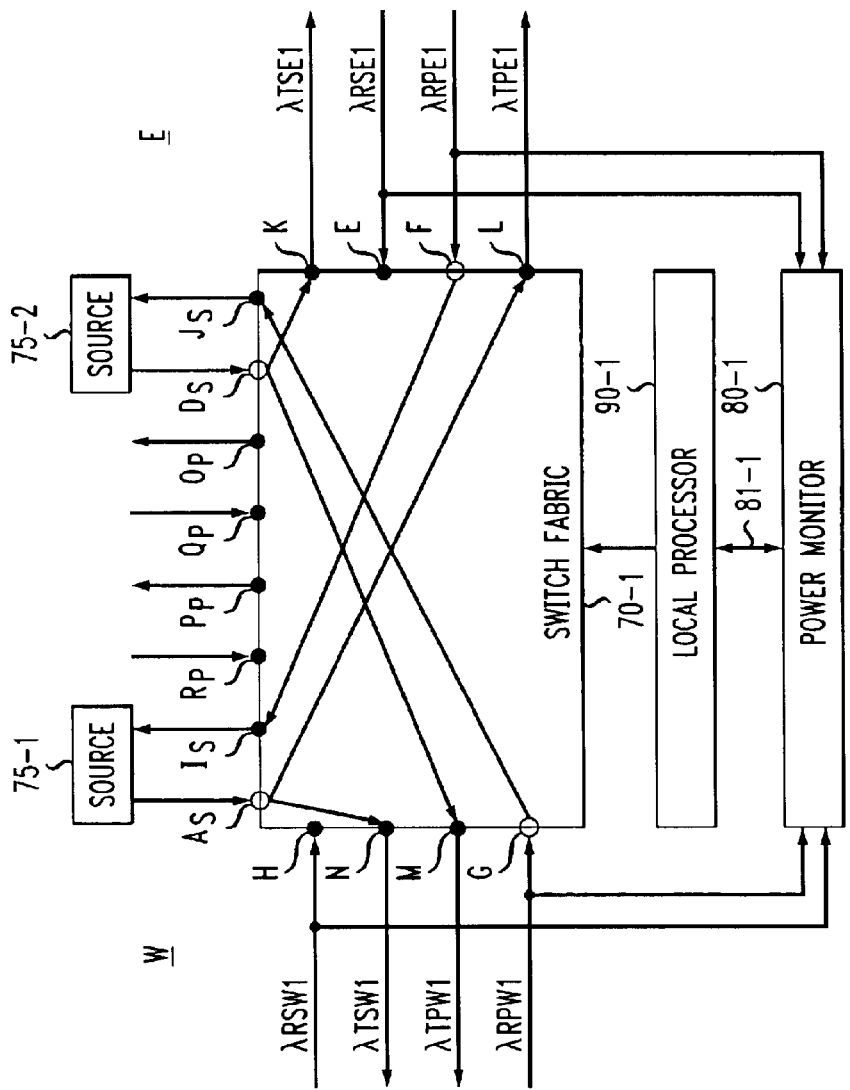

Both sources/clients served by a particular protection module may subscribe to path protection defined as protection state 20 in FIG. 4B as illustrated in FIG. 23. For this state, each source receives data in the opposite direction via the protection channel around the ring. The data that is supplied by each source is sent over the respective service channel and is also sent in the opposite direction in the protection channel. For example, as shown, data supplied by source 75-1 (75-2) to input port $A_S$ ($D_S$) is split and sent over port N in the West direction and over port L in the East direction around the ring. Data received via port F is supplied to output port $I_S$ for delivery to source 75-1. Data supplied by source 75-2 is similarly sent in opposite directions and data received in the opposite direction via the respective protection channel is delivered to source 75-2 via output port $J_S$.

Figure 24:
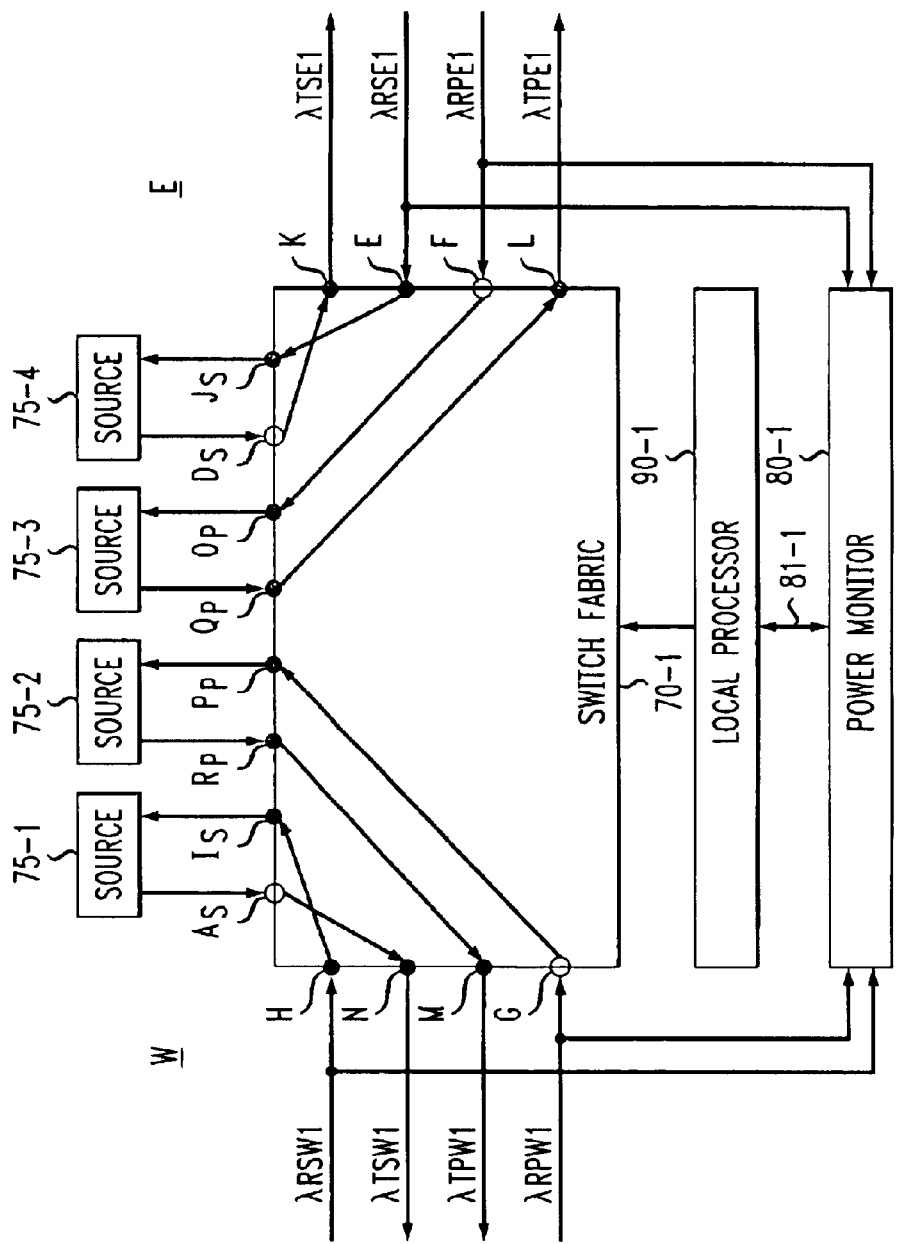

A protection module may support four independent sources, in which two of the sources respectively communicate in the East and West direction via the corresponding service channels and the other two sources respectively communicate in the East and West direction via the corresponding protection channels. The latter sources communicate what we call, as mentioned above, pre-emptory data/traffic, which is shed if a protection channel is needed to carry primary service data that is normally carried over a service channel. This case is illustrated in FIG. 24 and is defined as protection state 21 in FIG. 4B. As shown, primary data supplied by source 75-1 (75-4) to input port $A_S$ ($D_S$) is outputted to the service channel connected to output port N (K). Similarly, data received over service channel H (E) is supplied to output service port $I_S$ ($J_S$) for delivery to source 75-1 (75-4). Pre-emptory data/traffic supplied by source 75-2 (75-3) to input port $P_P$ ($Q_P$) is outputted to the protection channel connected to output port M (F). Similarly, pre-emptory data received over the protection channel connected to port G (F) is supplied to output protection port $P_P$ ($O_P$) for delivery to source 75-2 (75-3). If a LOS is detected for one of the service channels, then the pre-emptory traffic that is being sent over the corresponding protection channel supporting the failed service channel is shed. The service traffic for the failed channel is then transferred to the latter protection channel, in manner discussed above. For example, if a LOS is detected for signal channel $\lambda_{TSE1}$, then protection module 40-1 sheds the pre-emptory traffic that is being sent over that protection channel and transfers the service traffic, $\lambda_{TSE1}$, to that protection channel, $\lambda_{TPE1}$, by causing switch fabric 70-1 to controllably connect port $D_S$ to port L (not shown in FIG. 24).

Figure 25:
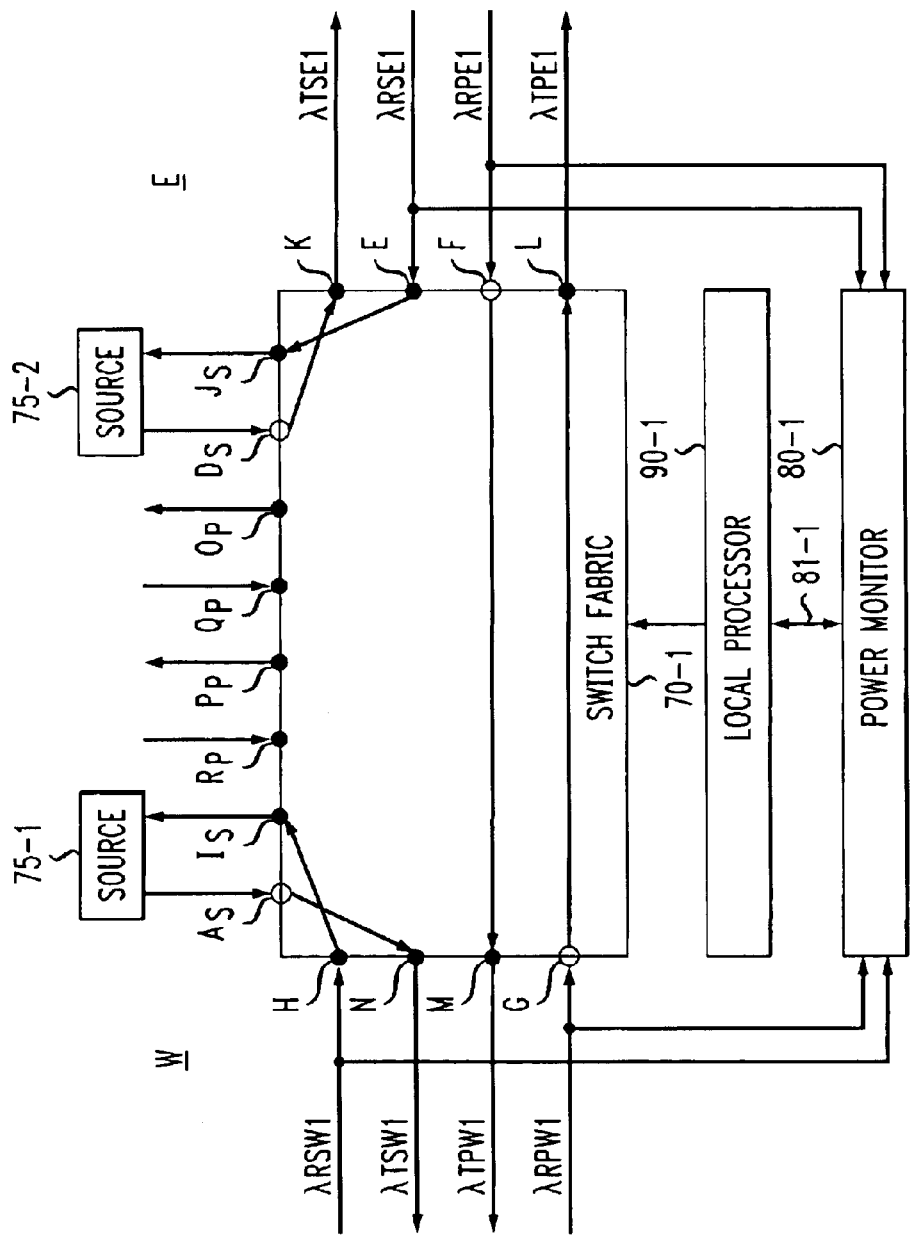

As mentioned above, when an optical protection module invokes span protection, then its associated node sends a message to the other nodes in the system via the control channel identifying the span protection and the faulty service channel/path. This is done so that the other nodes may complete the connection around the ring to interconnect the two nodes involved in the span protection for the failed service channel/span. Thus, upon receipt of the message, each of the other nodes invokes what we call a "protection channel pass through" state (defined as state 22 in FIG. 4B), which interconnects the protection channels on the east side of a protection module, namely, channels $\lambda_{RSEi}$ and $\lambda_{RPEi}$, with the protection channels on the west of side of the protection module, namely, channels $\lambda_{TPWi}$ and $\lambda_{RPWi}$. The other nodes do this for the identified failed channel and for each channel carried by a failed path. FIG. 25 illustrates the switch connections that are invoked to effect the "pass through" state at each of the intermediate protection modules 40-j.

Figure 26:
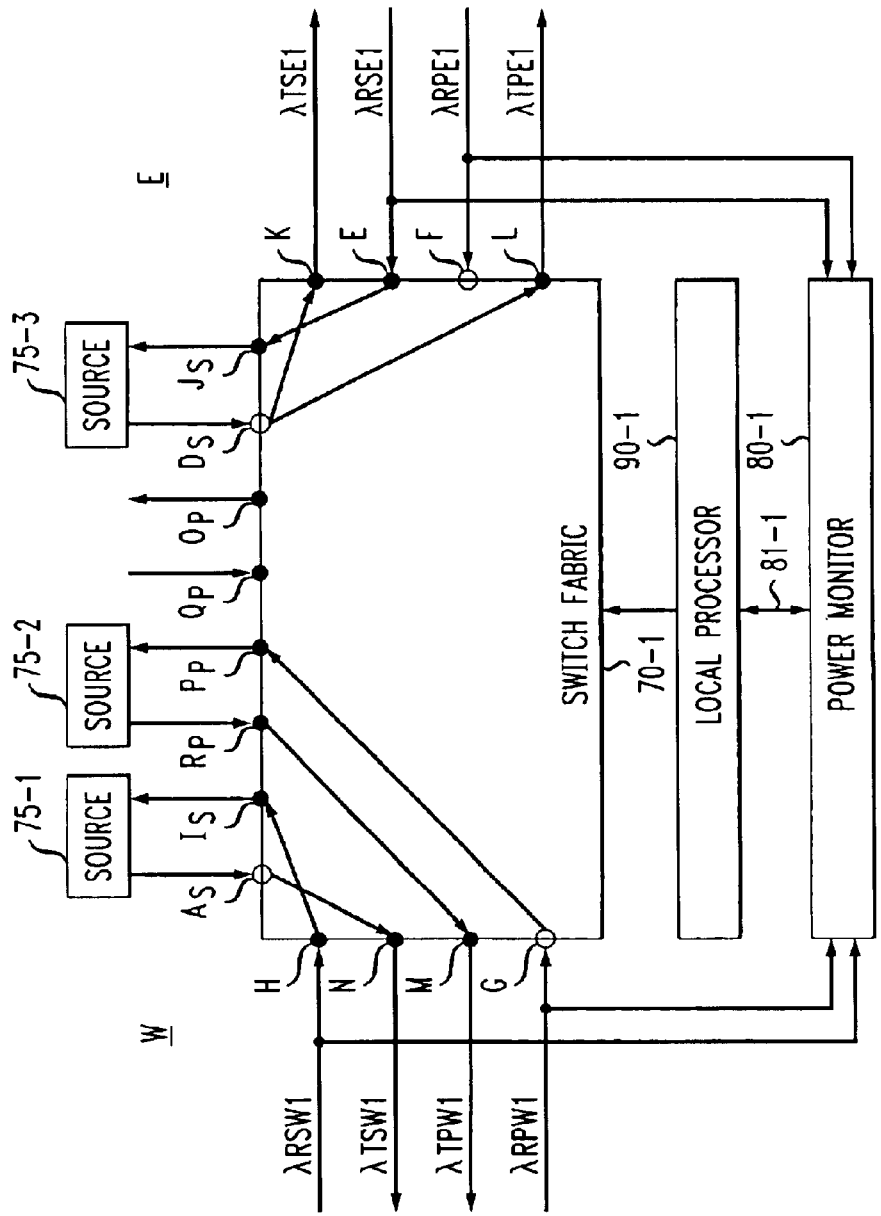
Figure 27:
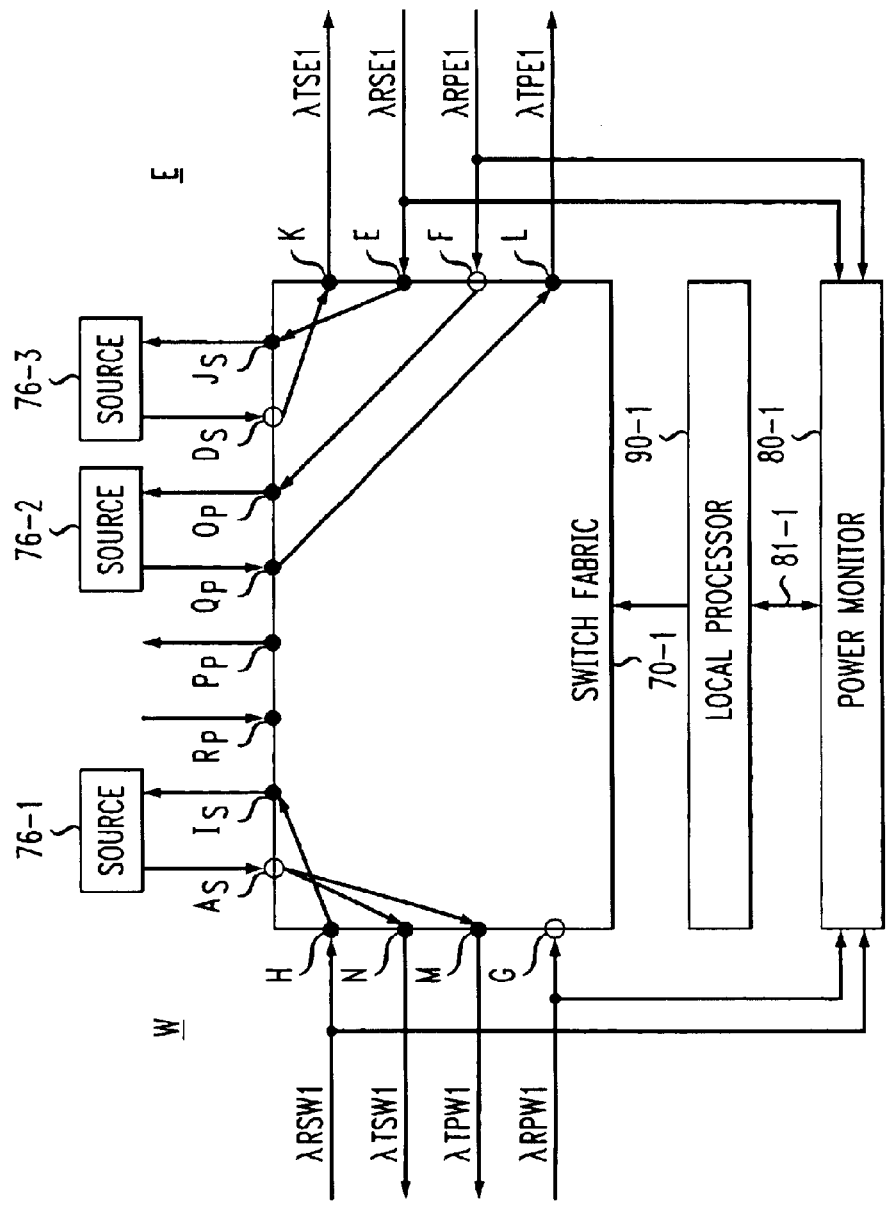

FIGS. 26 and 27 respectively illustrate what we call two service channel sources, protection access West, 1+1 span protection East ready and two service channel sources, protection access East, 1+1 span protection West ready, respectively defined as states 23 and 24 in FIG. 4B. The defined connection for these transmission states include one source transmission of pre-emptory traffic. Turning first to FIG. 26, it is seen that for this transmission state data signals received over the respective service channels, $\lambda_{RSW1}$ and $\lambda_{RSE1}$, are being dropped to independent sources 75-1 and 75-3, respectively. Signals supplied by source 75-3 are transmitted in the East direction over both the service and protection channel, $\lambda_{TSE1}$ and $\lambda_{RPE1}$, to effect 1+1 transmission in the East direction. Signals supplied by source 75-1 are transmitted in the West direction over just the service channel, $\lambda_{TSW1}$. Pre-emptory traffic supplied by independent source 75-2 is transmitted in the West direction over protection channel, $\lambda_{TPW1}$, and pre-emptory traffic received over protection channel $\lambda_{RPW1}$ is supplied to source 75-2, all in accordance with an aspect of the invention. If local processor 90-1 is notified in the described way that a LOS has been detected for channel $\lambda_{RSW1}$, then local processor directs switch fabric 70-1 to disconnect source 75-2 from protection channels, $\lambda_{RPW1}$ and $\lambda_{TPW1}$, and controllably connect port $I_S$ to incoming port G to effect protection switching. In addition, local processor 90-1 notifies the upstream module in the described way of the switch so that so that upstream module may transfer its transmission of data to the appropriate downstream protection channel. If, on the other hand, local processor 90-1 is notified in the described way that a LOS has been detected for channel $\lambda_{RSE1}$, then local processor directs switch fabric 70-1 to invoke protection state 10 for source 75-3.

For the sake of brevity and clarity FIG. 27 will not be discussed in detail herein since the two source path access (PA) East with 1+1 transmission in the West direction illustrated in that FIG. for sources 76-1, 76-2 and 76-3 is somewhat a mirror image of FIG. 26 discussed above.

Figure 28:
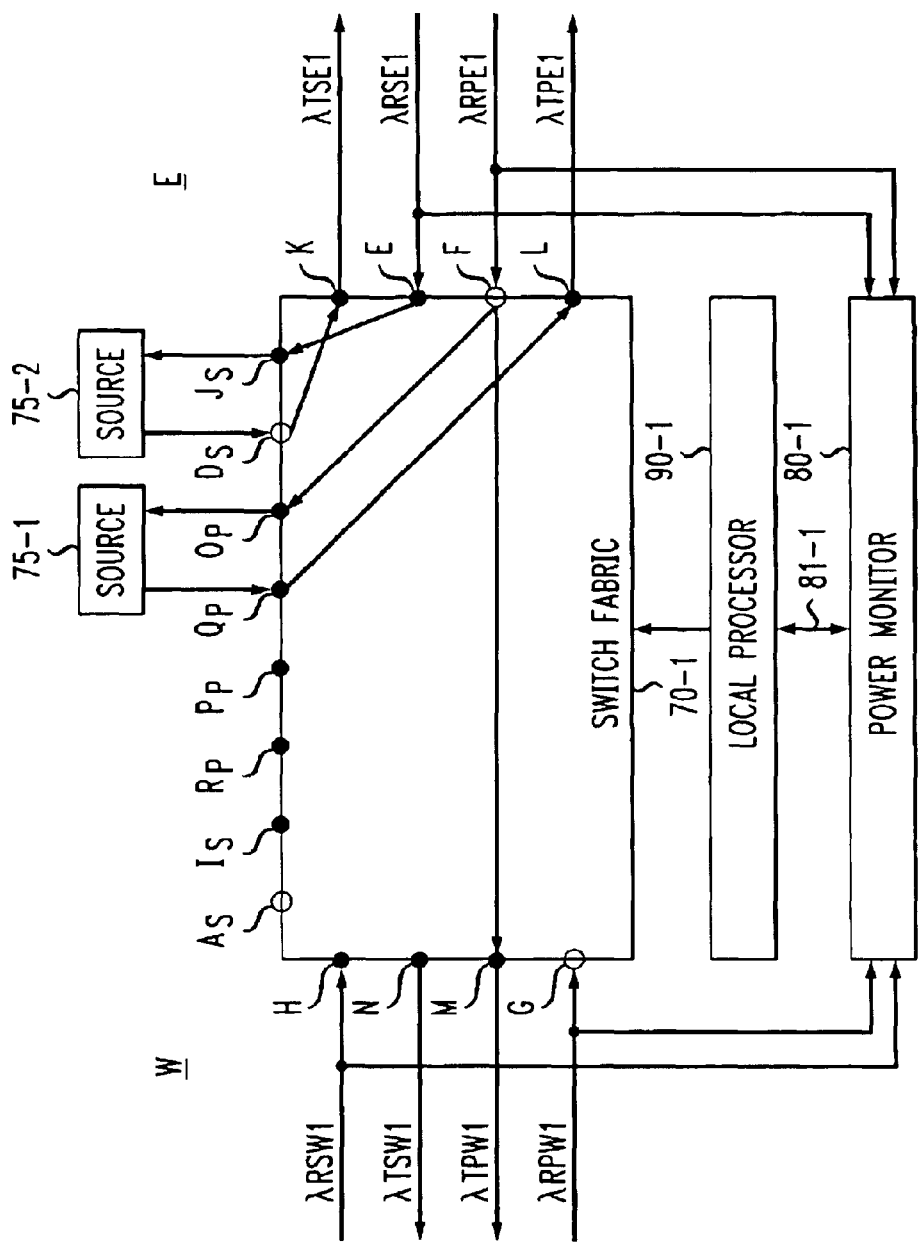
Figure 29:
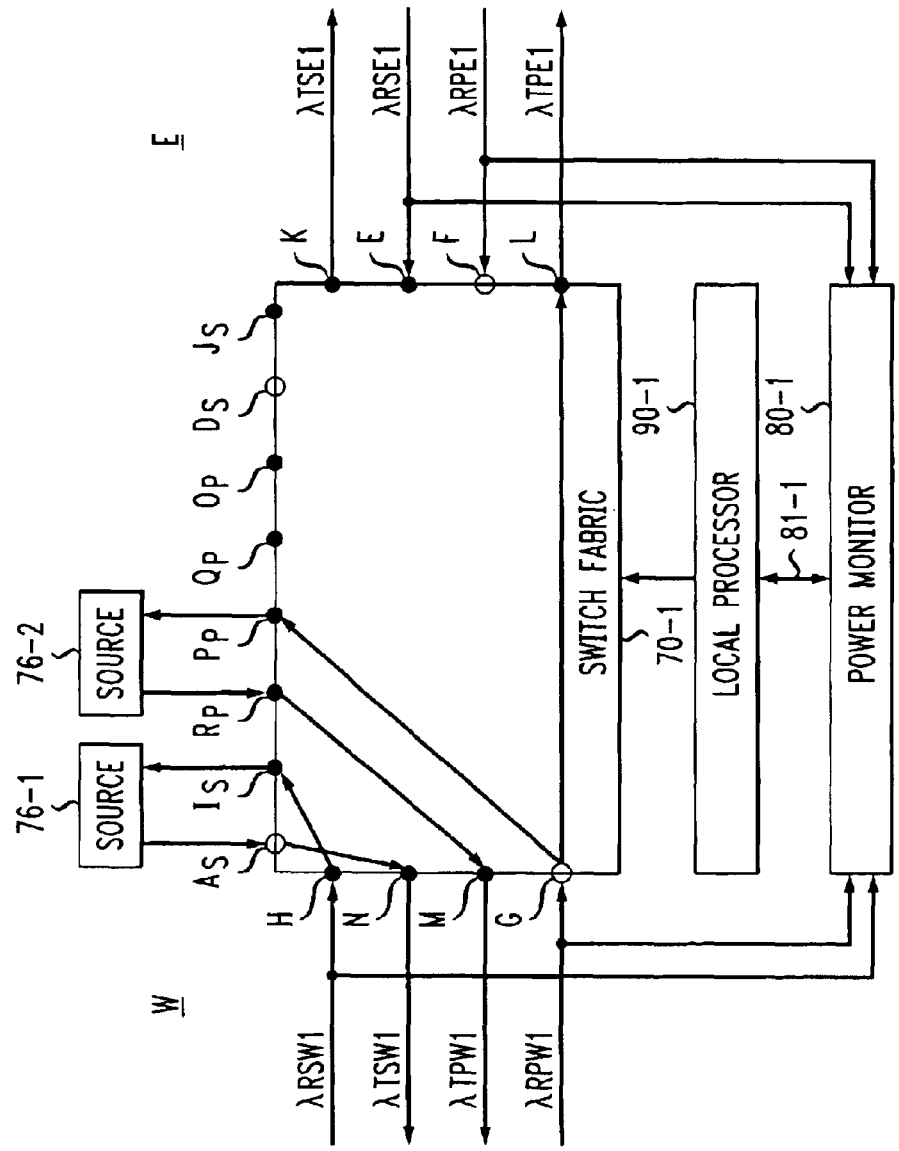

FIGS. 28 and 29 respectively illustrate simple transmission states that we call one service channel source, protection access East, path diverse 1+1 span protection East ready and one service channel source, protection access West, path diverse 1+1 span protection West ready, that are respectively defined as transmission states 25 and 26 in FIG. 4B. States 25 and 26 both provide an option for transmitting pre-emptory traffic over the unused protection channels as well as a keep alive connection to keep the upstream protection channel alive by re-transmitting the received pre-emptory traffic over that protection channel. In FIG. 28, source 75-2 in module 40-i communicates with a corresponding downstream module 40-j (FIG. 29) over service channels, $\lambda_{TSE1}$ and $\lambda_{TSE1}$, extended to ports K and E respectively. A direct connection between port K and port $D_S$ drops signals supplied by source 75-2 to service channel $\lambda_{TSE1}$ for transmission to the downstream module. A controllable connection established by fabric 70-1 between ports E and $J_S$ drops signals received from the downstream module over channel $\lambda_{TSE1}$ to source 75-2. Controllable connections established by switch fabric 70-1 at the direction of local processor 90-1 between ports F and $O_P$ and between ports L and $Q_P$ allow source 75-1 to communicate with another downstream module via the protection channel using pre-emptory traffic, as similarly described above. As mentioned, a controllable connection is also established between ports F and M to effect a keep the upstream protection channel $\lambda_{TPW1}$ alive using pre-emptory traffic received at port F. Similarly, if local processor 90-1 is notified in the described way that a LOS has been detected for channel $\lambda_{RSE1}$, then local processor directs switch fabric 70-1 to disconnect source 75-1 from protection channels, $\lambda_{RPE1}$ and $\lambda_{TPE1}$, and controllably connect port $J_S$ to incoming port G to effect protection switching. In addition, local processor 90-1 notifies the downstream module in the described way of the protection switching so that the downstream module, FIG. 29, may transfer its transmission of data to the appropriate upstream protection channel.

The configuration of switch 70-1 of downstream module 40-j, FIG. 29, somewhat mirrors the configuration of the switch 70-1 of upstream module 40-i, FIG. 28, with respect to sources 76-1 and 76-2. As such, for the sake of brevity and clarity, FIG. 29 will note be discussed herein.

Figure 30:
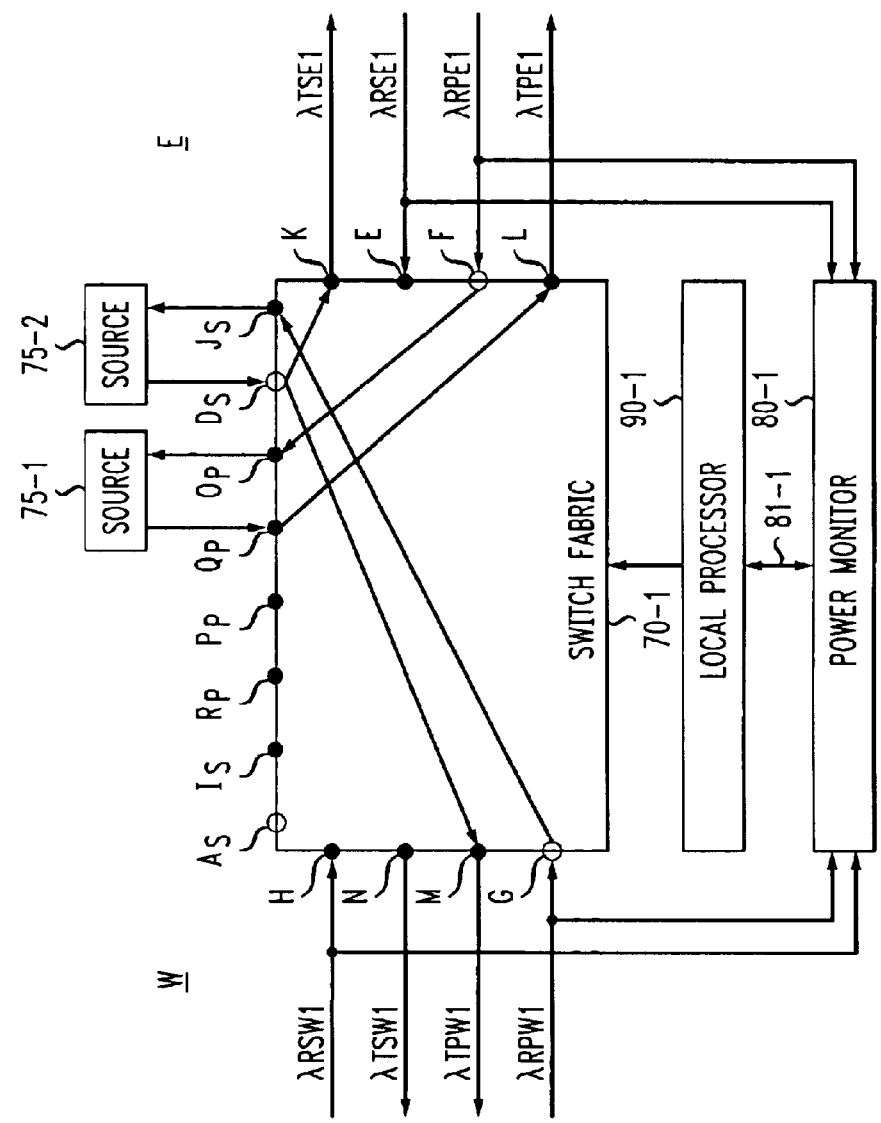
Figure 31:
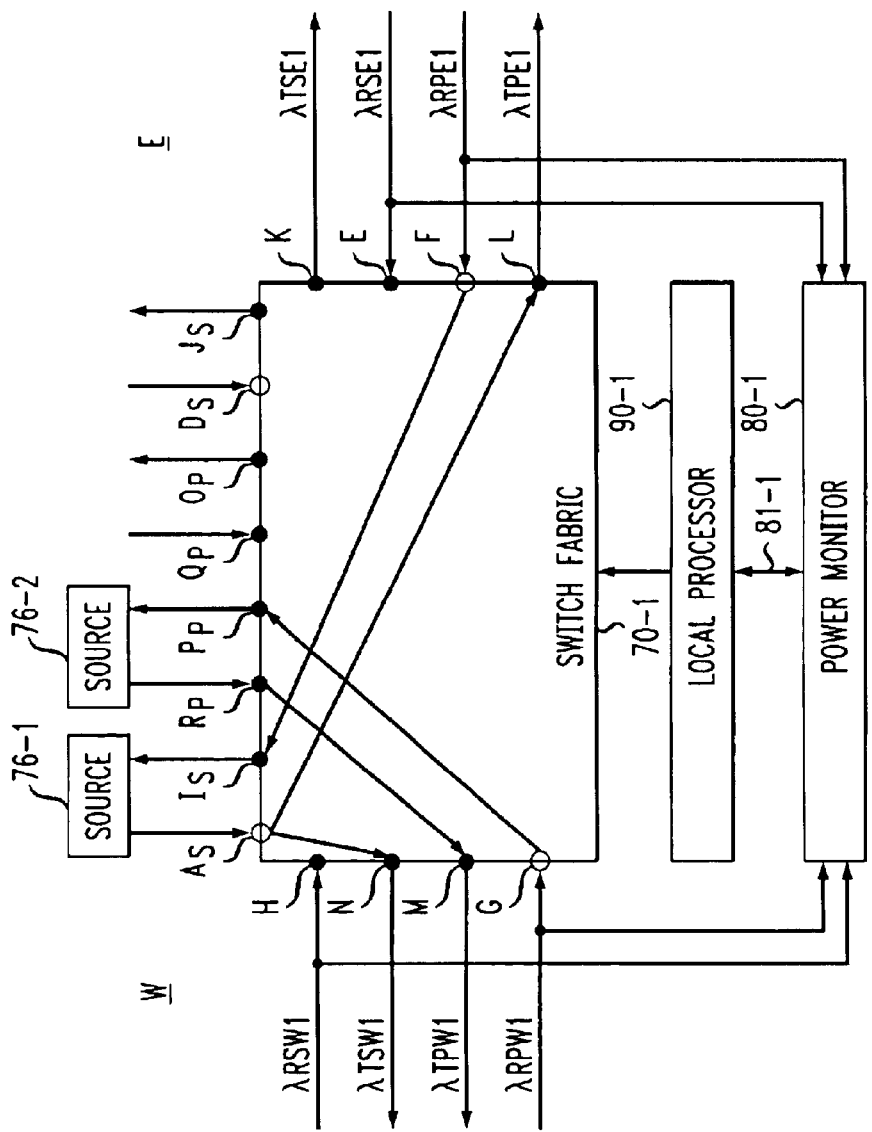

FIGS. 30 and 31 illustrate protection states respectively defined as states 27 and 28 in FIG. 4B, that are invoked to recover from a transmission 1 failure occurring between modules 40-i and 40-j communicating with another module in the East and West directions, respectively. In a quiescent transmission state, e.g., state 15 or 16, FIG. 4B, as the case may be, the protection channels between the two modules are used for the transmission of pre-emptory traffic. However, for these two protection states, the unused protection channels, $\lambda_{PTW1}$ and $\lambda_{RPW1}$, FIG. 30, that are used to transmit and receive in the opposite directions are used to recover from the ring failure, rather than the protection channels, $\lambda_{TPW1}$ and $\lambda_{RPW1}$, FIG. 30, between modules 40-i and 40-j, as will be explained below.

To effect protection state 27 in the East direction for module 40-i, local processor 90-1, FIG. 30, upon being notified of the problem in the described way directs switch fabric 70-1 to establish controllable connections from (a) incoming port G to port $J_S$ so that service signals/traffic received in the opposite West direction over channel $\lambda_{RPW1}$ may be dropped to source 75-2 and (b) port $D_S$ to outgoing port M so that service traffic supplied by source 75-2 may be sent to the downstream module in the opposite West direction over protection channel $\lambda_{TPW1}$. The prior connections between ports F and L and $O_P$ and $Q_P$ remain intact so that source 75-1 may communicate pre-emptory traffic downstream in the East direction. Local processor 90-1 in module 40-j, FIG. 31, also responds to the ring failure as a result of either detecting the problem via its associated power monitor 80-1 or being so notified in the described way. In particular, local processor 90-1, FIG. 31, effects protection state 28 in the West direction for module 40-j by directing its associated switch fabric 70-1 to establish controllable connections from (a) incoming port F to port $I_S$ so that service signals/traffic received in the opposite East direction over channel $\lambda_{RPE1}$ may be dropped to source 76-1 and (b) port $A_S$ to outgoing port L so that service traffic supplied by source 76-1 may be sent to the upstream module in the opposite East direction over protection channel $\lambda_{TPE1}$. The prior connections between ports M and G and $R_P$ and $P_P$ remain intact so that source 76-2 may communicate pre-emptory traffic upstream in the West direction, all in accordance with an aspect of the invention.

Figure 32:
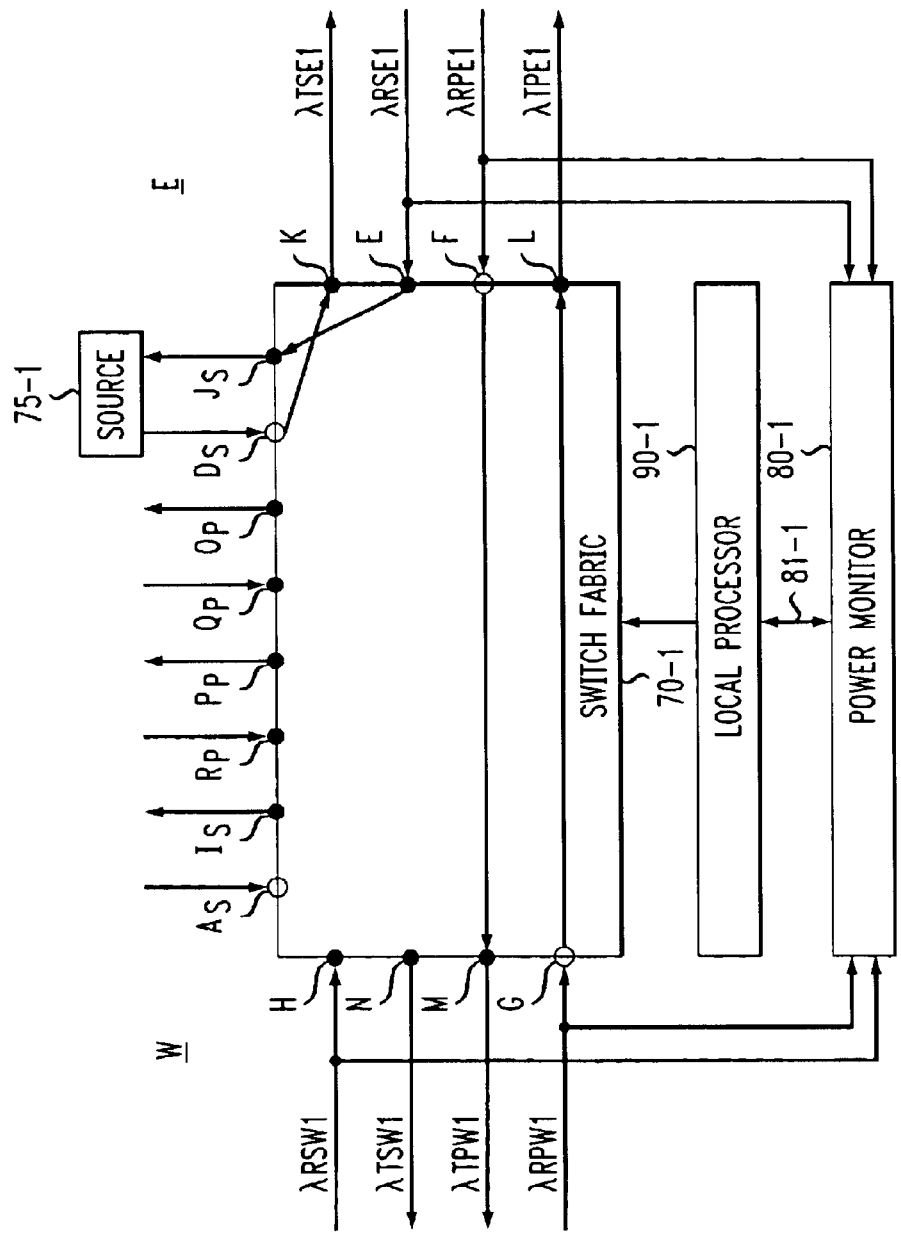
Figure 33:
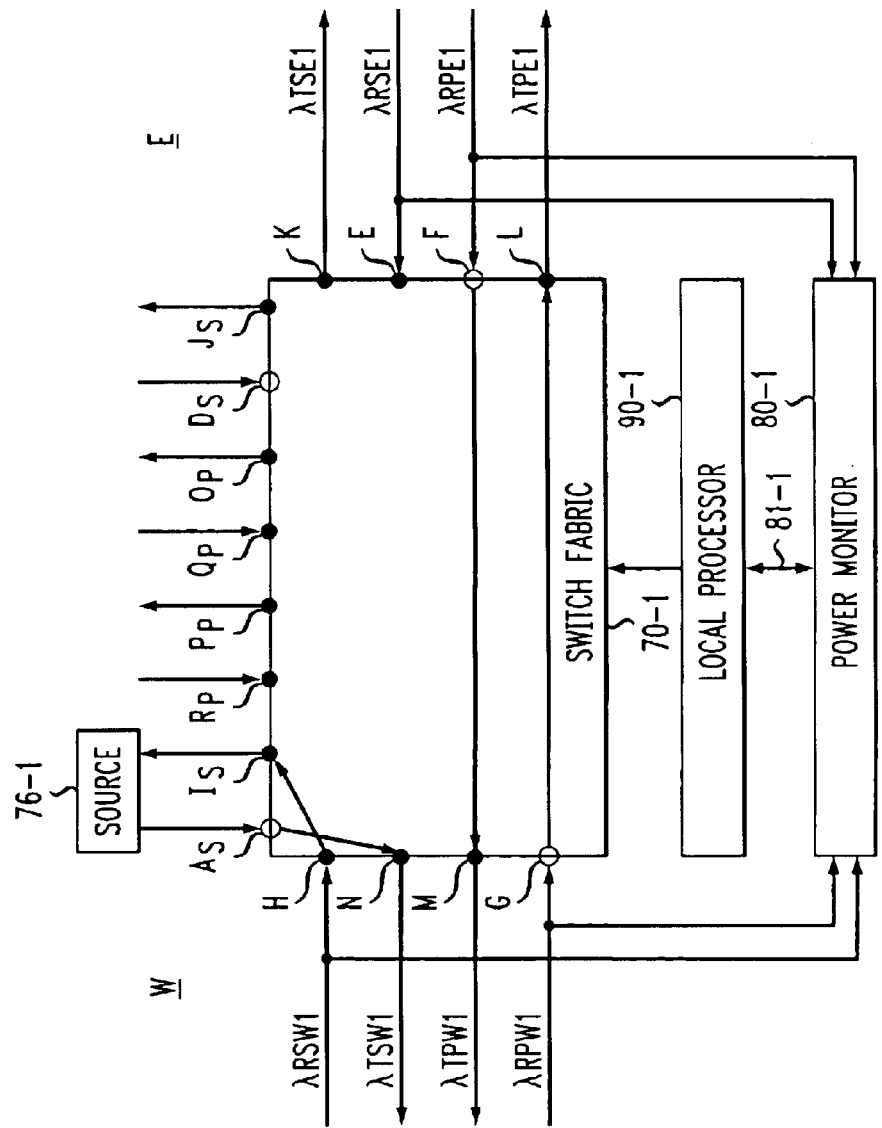

FIGS. 32 and 33 illustrate transmission states respectively defined as states 29 and 30 in FIG. 4B that implement pass through connections. It can be appreciated from FIGS. 32 and 33 that the connections effected by the respective switch fabric in modules 40-i and 40-j are somewhat simple and are not in need of further explanation.

A preferred embodiment of FIGS. 4A and 4B is shown in FIG. 34, in which additional port-to-port connections were added to each of the states to simplify the design of switch fabric 70-1, shown below. These added states do not interfere with the respective intended state, and, in this sense, may be thought of as don't care connections. Also, FIG. 34 indicates in field 34 whether contacts 11 and/or 12 ought to be opened. For example, for state 5, fabric 70-1 opens both contacts 11 and 12 and establishes additional connections between ports D and K, and E and J. However, opening both contacts 11 and 12 and establishing such additional connections do not interfere with the transport of signals between the basic switch fabric 70-1 connections A to N, A to L, F to I, and F to M, and so on for each of the other states. Field 34-1 similarly identifies the respective state. Fields 34-1 through 34-5 indicate by x whether a respective service channel source is present and active. Specifically, an x in field 34-2 (34-3) indicates that a protection channel source transmitting service traffic in the East (West) direction is present and active. An x in field 344 (34-5) indicates that a protection channel source transmitting pre-emptory traffic in the East direction (West) is present and active. Fields indicates by a T or a P that the corresponding state is a transmission or protection state.

Figure 35:
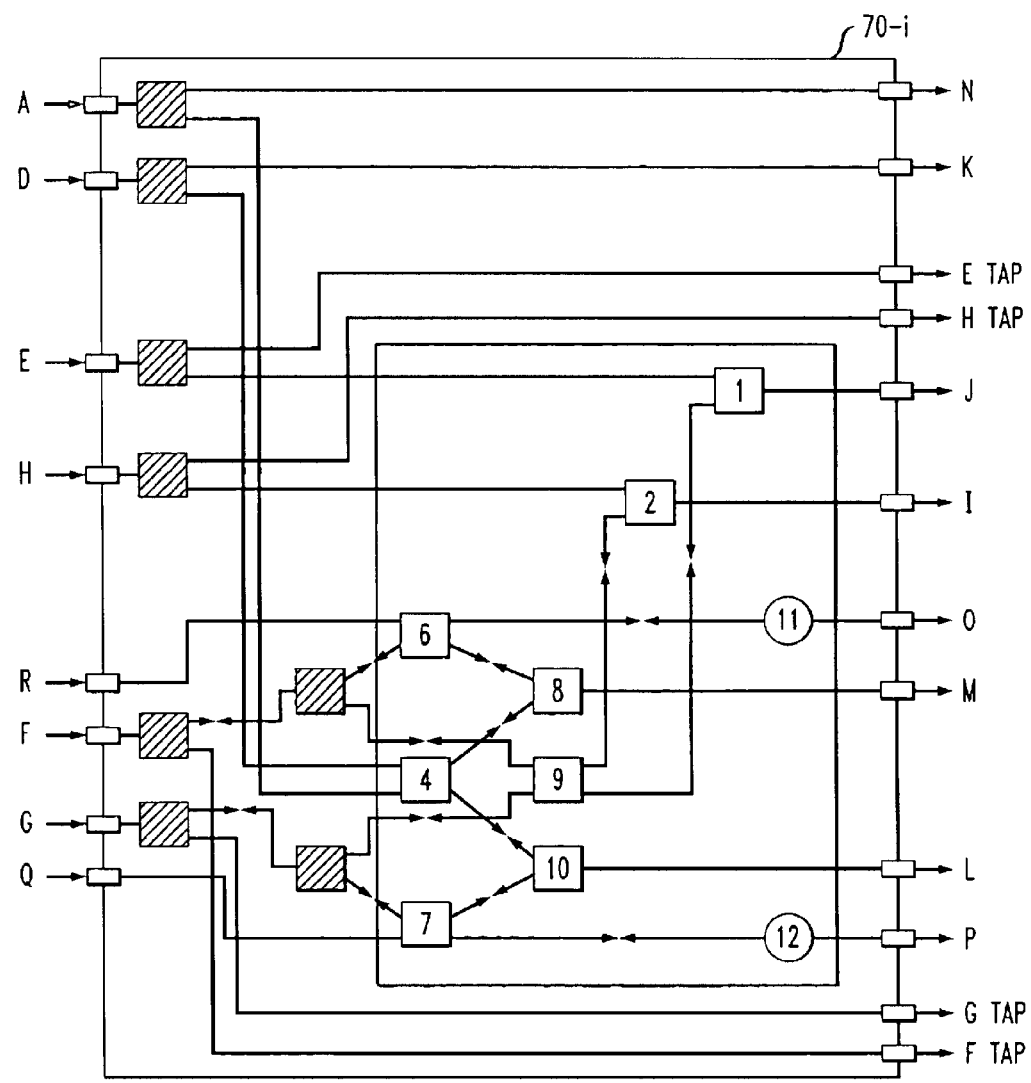
FIG. 35 is a broad block diagram of the switching fabric illustrated in, for example, FIG. 3 and FIGS. 5 through 33.

A broad block diagram of optical switch fabric 70-i is shown in FIG. 35, and may be implemented using discrete optical components. The diagonally lined rectangles are conventional optical splitters and the circles respectively designated 11 and 12 are conventional 1×1 switches that are used to shed ("dump") pre-emptory traffic (also referred to as dump ports). 1×1 optical switches 11 and 12 are also referred to herein as contacts. The point-to-point arrows shown in the FIG. 35 are used to indicate that a spliced connection (or some other similar connection) is used to interconnect a respective pair of optical devices. The switching matrix may also include a plurality of 1×2, 2×1 and 2×2 conventional optical switches, each of which operates under the control of its local processor 90-i. That is, local processor 90-i translates the LOS signals that it receives from its associated power monitor 80-i into a respective, predetermined pattern of, in this example, the 1×1, 1×2 and 2×2 switches. It then operates each such switch to create the desired connections, namely, one of the states defined in FIGS. 4A and 4B. The switch fabric also includes maintenance tap ports for a number of the signals, i. e., the signals inputted to ports E, H, G and F. The taps are used for maintenance purposes and exercising the switch fabric.

Figure 36:
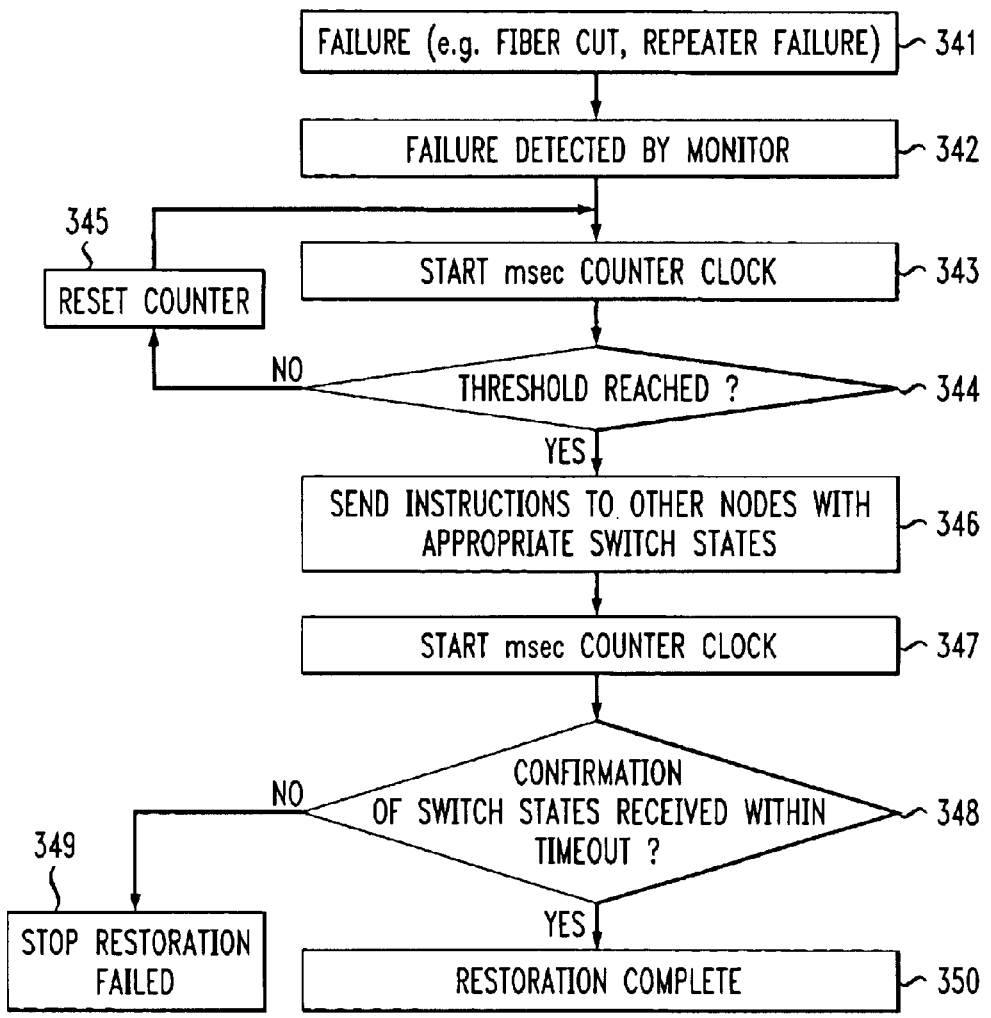
FIG. 36 is flow chart of the operation of the local processor, shown in, for example, FIG. 3.

FIG. 36 illustrates in flow chart form the operation of a local processor 90-i of an optical node. The process starts at block 341 in response to a failure indication (LOS) from the associated power monitor. Block 342 indicates that the power monitor has detected and indicated a failure. The process then starts a so-called millisecond (msec) timer/counter clock at block 343. The contents of the counter is tested at block 344 to determine if the counter reached a predetermined threshold characterizing a predetermined interval of time. If not, then control passes to block 345 where the counter is reset and control is returned to block 703. If so, then control proceeds to block 345 where it causes instructions to be sent via the maintenance/control channel to other optical nodes in the optical ring communications system including appropriate optical switch states. At block 347, control starts another msec counter clock. The contents of the latter counter is tested at block 348 to determine if, within a predetermined interval of time t, confirmation had been received via the control channel indicating that the switch states sent at block 346 have been completed. If not, then control proceeds to block 349 where it notes that the restoration failed. If so, then control proceeds to block 350 to indicate that the restoration was completed successfully.

It will thus be appreciated that, although the invention illustrated herein is described in the context of a specific illustrative embodiment, those skilled in the art will be able to devise numerous alternative arrangements which, although, not explicitly shown or described herein, nevertheless, embody the principles of the invention and are within its spirit and scope. For example, it goes without saying that the transmission media is optical fiber. Moreover, the inventive principles may be applied to non-optical systems, e.g., electrical transmission systems. As another example, the optical power monitor may be arranged to also monitor the levels of the signals transported over the connections between the switch fabric a source.

We claim:

1. Optical signal protection apparatus for use in an optical node intended to be interconnected with a plurality of optical nodes in an optical transmission ring configuration, the optical signal protection apparatus comprising a plurality of optical inputs to which optical signals of a predetermined one of a plurality of optical channels are intended to be supplied, a plurality of optical outputs to which optical signals of said predetermined optical channel are intended to be supplied, an optical switch matrix having a plurality of optical switching states including at least "keep-alive" and "protection access" states, said optical switch matrix being responsive to switch control signals to effect one of the switching states by interconnecting predetermined one of the optical inputs with predetermined ones of the optical outputs, and an optical power monitor having a number of inputs to which a portion of respective ones of the optical input signals are supplied, wherein said optical power monitor declares a loss of signal if one of said ones of the optical input signals meets predetermined criteria, said loss of signal initiating generation of said switch control signals.

2. The protection apparatus of claim 1 wherein said optical power monitor declares a loss of signal when (a) any one of said ones of the optical input signals is not received, (b) the level of any one of said ones of the optical input signals is below a predetermined threshold, (c) if the level of any one of said ones of the optical input signals remains at a predetermined logic level for a predetermined amount of time, (d) the signal-to-noise ratio of any one of said ones of the optical input signals is below a predetermined signal-to-noise ratio, or (e) the error rate of any one of said ones of the optical input signals is greater than a predetermined error rate.

3. The protection apparatus claim 1 wherein said optical switching states further include ring failure east and ring failure west states, a plurality of span protection states, and a pass through state.

4. The protection apparatus of claim 3 wherein the pass through state includes a pass through state for a one service channel source active and for two service channel sources active.

5. The protection apparatus of claim 1 wherein ones of the plurality of optical input signals transport pre-emptory traffic, and wherein the protection apparatus sheds the pre-emptory traffic whenever one of a particular group of the optical switching states is effected.

6. The protection apparatus of claim 1 wherein the switch matrix includes a plurality of controllable optical switch units each having one or more optical inputs and one or more optical outputs.

7. The protection apparatus of claim 6 wherein each of the optical switching states is effected by controllably operating particular ones of the optical switch units.

8. An optical node for use in an optical transmission system including a plurality of optical nodes connected by at least two optical transmission media in an optical transmission ring configuration, the at least two transmission media providing active optical service transmission capacity and optical protection transmission capacity for each of a plurality of optical channels identified by respective wavelengths, the node comprising
- a plurality of optical switch fabrics each having a plurality of optical switching states including at least "keep-alive" and "protection access" states, and being responsive to switch control signals to controllably switch a respective one of the channels between optical service capacity and optical protection capacity of said at least two transmission media,
- a plurality of power monitors associated with respective ones of the switch fabrics, each of said power monitors being operative for monitoring the respective one of the service channels and declaring a loss signal if the respective channel signal fails to meet predetermined criteria, and
- a plurality of processors associated with respective ones of the power monitors, in which each of said processors, responsive to a loss of signal indication from the respective one of the power monitors, is operative for supplying the switch control signals to the respective one of the switch fabrics to effect that one of the switching states defined by the supplied switch control signals.

9. The optical node of claim 8 further comprising a maintenance controller, responsive to the failure indication and identity of that one of the optical channels that failed, for generating a maintenance message identifying the failure and identity of the failed channel and sending the message to each of the other nodes via a service control channel.

10. The optical node of claim 9 wherein each of the other nodes effect a particular one of the switching states for the identified channel responsive to receipt of the message.

11. The optical node of claim 8 wherein said predetermined criteria is met when (a) the respective one of the channels is not received, (b) the level of the respective channel signal is below a predetermined threshold, (c) the level of the respective channel signal remains at a predetermined logic level for a predetermined amount of time, (d) the signal-to-noise ratio of the respective channel signal is below a predetermined signal-to-noise ratio, or (e) the error rate of the respective channel signal is greater than a predetermined error rate.

12. The optical node of claim 8 wherein the said optical switching states further include failure east and failure west states, a number of span protection states, and a pass through state.

13. The optical node of claim 8 wherein the protection capacity for at least one of the channels may be used to transport pre-emptory traffic, which is forwarded to a dump port of the respective one of the switch fabrics whenever that switch fabric effects one of a particular group of the optical switching states.

14. The optical node of claim 8 wherein each switch fabric comprises a plurality of controllable optical switch units each having one or more optical inputs and one or more optical outputs.

15. The optical node of claim 14 wherein each of the optical switching states is effected by controllably operating particular ones of the optical switch units.

16. An optical transmission system including a plurality of optical nodes connected in a ring configuration by at least two optical transmission media in a first direction of transmission and at least two optical transmission media in a second direction of transmission, wherein the optical transmission media in the first and second directions both have service and protection capacity, each of the optical nodes comprising,
- a plurality of optical protection apparatus for monitoring respective ones of a plurality of optical channels transported over the optical transmission media, and wherein each of said plurality of optical protection apparatus comprise,
- a power monitor operative for monitoring the respective one of the service channels and declaring a loss signal if the respective channel signal meets predetermined criteria,
- an optical switch fabric having a plurality of optical switching states including at least "keep-alive" and "protection access" states, and being responsive to switch control signals to controllably switch the respective one of the channels between the optical service capacity and optical protection capacity of any of said at least two transmission media, and
- a processor responsive to a loss of signal indication from the power monitor for supplying the switch control signals to the switch fabrics to effect that one of the switching states defined by the supplied switch control signals.

17. The optical transmission system of claim 16 wherein each of the nodes further comprises a maintenance controller, responsive to receipt of at least a loss-of-signal indication from any one of said processor, for notifying the other nodes of the loss of signal via a control channel of said transmission media.

18. The optical transmission system of claim 17 wherein each of the other nodes, responsive to receipt of the notification, effect a particular one of the switching states for the affected channel.

19. The optical transmission system of claim 16 wherein said predetermined criteria is met when (a) the respective one of the channels is not received, (b) the level of the respective channel signal is below a predetermined threshold, (c) the level of the respective channel signal remains at a predetermined logic level for a predetermined amount of time, (d) the signal-to-noise ratio of the respective channel signal is below a predetermined signal-to-noise ratio, or (e) the error rate of the respective channel signal is greater than a predetermined error rate.

20. The optical transmission system of claim 16 wherein said optical switching states further include failure east and failure west states, a number of span protection states, and a pass through state.

21. The optical transmission system of claim 16 wherein the protection capacity for at least one of the channels may be used to transport pre-emptory traffic, in which the pre-emptory traffic is forwarded to a dump port whenever the switch fabric effects one of a particular group of the optical switching states.

22. The optical transmission system of claim 16 wherein the switch fabric includes a plurality of controllable optical switch units each having one or more optical inputs and one or more optical outputs.

23. The optical transmission system of claim 22 wherein each of the optical switching states is effected by controllably operating particular ones of the optical switch units.

24. The optical transmission system of claim 16 wherein each of said transmission media is optical fiber.

25. Optical signal protection apparatus for use in an optical node intended to be interconnected with a plurality of optical nodes in an optical transmission ring configuration, the optical signal protection apparatus comprising a switch matrix having a first set of inputs and outputs for transmitting and receiving optical signals in a first predetermined direction using either service or protection capacity provisioned for said first direction, a second set of inputs and outputs for transmuting and receiving optical signals in a second predetermined direction using either service or protection capacity provisioned for said second direction, and at least another third set of inputs and outputs for exchanging signals with respective ones of a plurality of sources of signals, and apparatus for controllably causing said switch matrix to establish different switched configurations for ones of said sources such that one of said sources transmits and receives signals in said first direction using said service capacity and another one of said sources transmits and receives signals in said second direction using said protection capacity.

26. The optical signal protection apparatus of claim 25 wherein one of switched configurations allows still another one of said sources to transmit and receive signals in said first direction using said protection capacity provisioned for that direction.

27. Optical signal apparatus for use in an optical node intended to be interconnected with a plurality of optical nodes in an optical transmission ring configuration, the optical signal protection apparatus comprising a switch matrix having a first set of inputs and outputs for transmitting and receiving optical signals in a first predetermined direction using either service or protection capacity provisioned for said first direction, a second set of inputs and outputs for transmitting and receiving optical signals in a second predetermined direction using either service or protection capacity provisioned for said second direction, and at least another third set of inputs and outputs for exchanging signals with respective ones of a plurality of sources of signals, and apparatus for controllably causing said switch matrix to establish a predetermined transmission configuration for ones of said sources based on predetermined criteria, in which said predetermined transmission configuration is selected from a group of predefined transmission states including two service channel sources, 1+1 span protection East ready, and 1+1 span protection West ready state.

28. The optical apparatus of claim 27 wherein said first direction is East and said second direction is West and wherein said group of predefined transmission states further includes two service channel sources, protection access West, 1+1 span protection East ready state, and a two service channel sources, protection access West, 1+1 span protection East ready state.

29. The optical apparatus of claim 27 wherein said first direction is East and said second direction is West and wherein said group of predefined transmission states further includes a pass through state.

30. The optical apparatus of claim 27 wherein said first direction is East and said second direction is West and wherein said group of predefined transmission states further includes a two source keep alive state defined as a two service channel sources, path diverse 1+1 span protection East and West ready state.

31. The optical apparatus of claim 27 wherein said first direction is East and said second direction is West and wherein said group of predefined transmission states further includes a two service channel sources, protection channel pass through state.

32. Optical signal apparatus for use in an optical node intended to be interconnected with a plurality of optical nodes in an optical transmission ring configuration, the optical signal protection apparatus comprising a switch matrix having a first set of inputs and outputs for transmitting and receiving optical signals in a first predetermined direction using either service or protection capacity provisioned for said first direction, a second set of inputs and outputs for transmitting and receiving optical signals in a second predetermined direction using either service or protection capacity provisioned for said second direction, and at least another third set of inputs and outputs for exchanging signals with respective ones of a plurality of sources of signals, and apparatus, responsive to a failure occurring in one of said first and second transmission directions, for controllably causing said switch matrix to establish a predetermined protection configuration for ones of said sources to recover from said failure, in which said predetermined protection configuration is selected from a group of predefined controllable switching states including a two service channel sources, 1+1 span protection East active, 1+1 span protection West active.

33. The optical apparatus of claim 32 wherein said first direction is East and said second direction is West and wherein said group of predefined switching states further includes a two service channel sources, 1+1 span protection East active with protection access West state and a two service channel sources, 1+1 span protection West active with protection access East state.

34. The optical apparatus of claim 32 wherein said first direction is East and said second direction is West and wherein said group of predefined switching states further includes a two service channel sources, path diverse 1+1 span protection East active, normal operation West state and a two service channel sources, path diverse 1+1 span protection West active, normal operation East state.

35. The optical apparatus of claim 32 wherein said first direction is East and said second direction is West and wherein said group of predefined switching states further includes a two service channel sources, 1+1 span protection East ready, 1+1 span protection West active protection state and a two service channel sources, 1+1 span protection East ready, 1+1 span protection West active protection state.

36. The optical apparatus of claim 32 wherein said first direction is East and said second direction is West and wherein said group of predefined switching states further includes a two service channel sources, path diversity 1+1 span protection West active, path diverse 1+1 span protection East ready state and a two service channel sources, path diversity 1+1 span protection East active, path diverse 1+1 span protection West ready state.

37. The optical apparatus of claim 32 wherein said first direction is East and said second direction is West and wherein said group of predefined switching states further includes a two service channel sources, path diverse 1+1 span protection East and West active.

38. The optical apparatus of claim 32 wherein said first direction is East and said second direction is West and wherein said group of predefined switching states further includes protection access for both the East and West directions.

39. Optical signal apparatus for use in an optical node intended to be interconnected with a plurality of optical nodes in an optical transmission ring configuration, the optical signal protection apparatus comprising a switch matrix having a first set of inputs and outputs for transmitting and receiving optical signals in a first predetermined direction using either service or protection capacity provisioned for said first direction, a second set of inputs and outputs for transmitting and receiving optical signals in a second predetermined direction using either service or protection capacity provisioned for said second direction, and at least another third set of inputs and outputs for exchanging signals with a source of signals, and apparatus, responsive to a failure occurring in one of said first and second transmission directions, for controllably causing said switch matrix to establish a predetermined protection configuration for said source to recover from said failure, in which said predetermined protection configuration is selected from a group of predefined controllable switching states including a one service channel source, path diverse 1+1 span protection state.

40. The optical apparatus of claim 39 wherein said first direction is East and said second direction is West and wherein said group of predefined switching states further includes protection access for both the East and West directions.

41. The optical apparatus of claim 39 wherein said first direction is East and said second direction is West and wherein said group of predefined switching states further includes a one service channel source, protection access East, path diverse 1+1 span protection East active and one service channel source, protection access West, path diverse 1+1 span protection West active.

42. The optical apparatus of claim 39 wherein said first direction is East and said second direction is West and wherein said group of predefined switching states further includes a one service channel source, 1+1 span protection East active and one service channel source, 1+1 span protection West active protection states.

43. The optical apparatus of claim 39 wherein said first direction is East and said second direction is West and wherein said group of predefined switching states further includes one service channel source, path diverse 1+1 span protection East active one service channel source, path diverse 1+1 span protection West active protection states.

44. The optical apparatus of claim 39 wherein said first direction is East and said second direction is West and wherein said group of predefined switching states further includes one service channel source, protection access East, path diverse 1+1 span protection East active state and a one service channel source, protection access West, path diverse 1+1 span protection West active state.

45. Optical signal apparatus for use in an optical node intended to be interconnected with a plurality of optical nodes in an optical transmission ring configuration, the optical signal protection apparatus comprising a switch matrix having a first set of inputs and outputs for transmitting and receiving optical signals in a first predetermined direction using either service or protection capacity provisioned for said first direction, a second set of inputs and outputs for transmitting and receiving optical signals in a second predetermined direction using either service or protection capacity provisioned for said second direction, and at least another third set of inputs and outputs for exchanging signals with respective ones of a plurality of sources of signals, and apparatus for controllably causing said switch matrix to establish a predetermined transmission configuration for ones of said sources based on predetermined criteria, in which said predetermined transmission configuration is selected from a group of predefined transmission states including a one service channel source protection access East, path diverse 1+1 span protection West ready state and a one service channel source protection access West, path diverse 1+1 span protection East ready state.

46. The optical apparatus of claim 45 wherein said first direction is East and said second direction is West and wherein said group of predefined transmission states further includes a one service channel source East, protection channel pass through state, and a one service channel source East, protection channel pass through state.

* * * * *